(12) United States Patent
Takagi et al.

(10) Patent No.: US 6,243,755 B1
(45) Date of Patent: *Jun. 5, 2001

(54) INFORMATION PROCESSING SYSTEM USING INFORMATION CACHING BASED ON USER ACTIVITY

(75) Inventors: Masahiro Takagi; Takashi Kamitake, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/115,745

(22) Filed: Jul. 15, 1998

Related U.S. Application Data

(63) Continuation of application No. 08/612,289, filed on Mar. 7, 1996, now Pat. No. 5,881,231.

(30) Foreign Application Priority Data

Mar. 7, 1995  (JP) .................................................. 07-047570

(51) Int. Cl.[7] ...................................................... G06F 15/16
(52) U.S. Cl. .......................... 709/229; 709/201; 709/202; 709/217; 709/226; 711/170; 711/164; 713/200
(58) Field of Search ........................... 342/457; 382/305; 709/217–226, 229, 201, 202; 711/170, 164; 712/216, 217; 707/100, 4, 3; 713/200

(56) References Cited

U.S. PATENT DOCUMENTS

| | | | |
|---|---|---|---|
| 5,029,104 | 7/1991 | Dodson et al. | 364/514 |
| 5,305,389 | 4/1994 | Palmer | 382/1 |
| 5,345,584 | 9/1994 | Hill | 395/600 |
| 5,487,156 * | 1/1996 | Popescu et al. | 712/217 |
| 5,511,175 * | 4/1996 | Favor et al. | 712/216 |
| 5,572,221 * | 11/1996 | Marlevi et al. | 342/457 |

OTHER PUBLICATIONS

Kistler et al., "Disconnected Operation in the Coda File System", ACM Transaction on Computer Systems, vol. 10, No. 1, pp. 3–25, Feb. 1992.

Korner, "Intelligent Caching for Remote File Service", Computer Systems, pp. 220–226, May 28, 1990.

Lim, "Adaptive Caching in a Distributed File System", Ph.D Thesis, Abstract oly (1996).

Jain et al., "A Caching Strategy to Reduce Network Impacts of PCS" IEEE (1994).

Lim et al., "A Remote File System for Heterogeneous Network Topologies" IEEE (1993).

* cited by examiner

*Primary Examiner*—Ayaz Sheikh
*Assistant Examiner*—Firmin Backer
(74) *Attorney, Agent, or Firm*—Foley & Lardner

(57) ABSTRACT

An information processing system in which the necessary information can be transferred via a network by the time this information becomes actually necessary, without damaging the utility and convenience from the user's point of view. An information transfer to a first information processing apparatus from a second information processing apparatus via a network is realized by predicting a necessary information which will be required by a user using the first information processing apparatus in future and a necessary time by which the necessary information will be actually required by the user, according to a knowledge concerning an activity schedule of the user; and controlling the transfer of the necessary information from the second information processing apparatus to the first information processing apparatus via the network such that the necessary information will be transferred by the necessary time.

20 Claims, 14 Drawing Sheets

FIG.3

| DATE & TIME | PLACE | DATA | APPLICATION | NETWORK ENVIRONMENT |
|---|---|---|---|---|
| | | | | |

FIG.4

| | DATE & TIME | PLACE | DATA | APPLICATION | NETWORK ENVIRONMENT |
|---|---|---|---|---|---|
| RULE-1 ... RULE-n | | | | | |

FIG.5

| DATE & TIME | PLACE | CONTENT |
|---|---|---|
| | | |

FIG.6

| TIME LIMIT | CONTENT | AMOUNT OF WORK | AMOUNT OF WORK DONE | AMOUNT OF REMAINING WORK |
|---|---|---|---|---|
| | | | | |

FIG.7

| TIME ZONE | PLACE | ACTIVITY/ WORK | POSSIBILITY | DATA | APPLICATION | NETWORK ENVIRONMENT |
|---|---|---|---|---|---|---|
| | | | | | | |

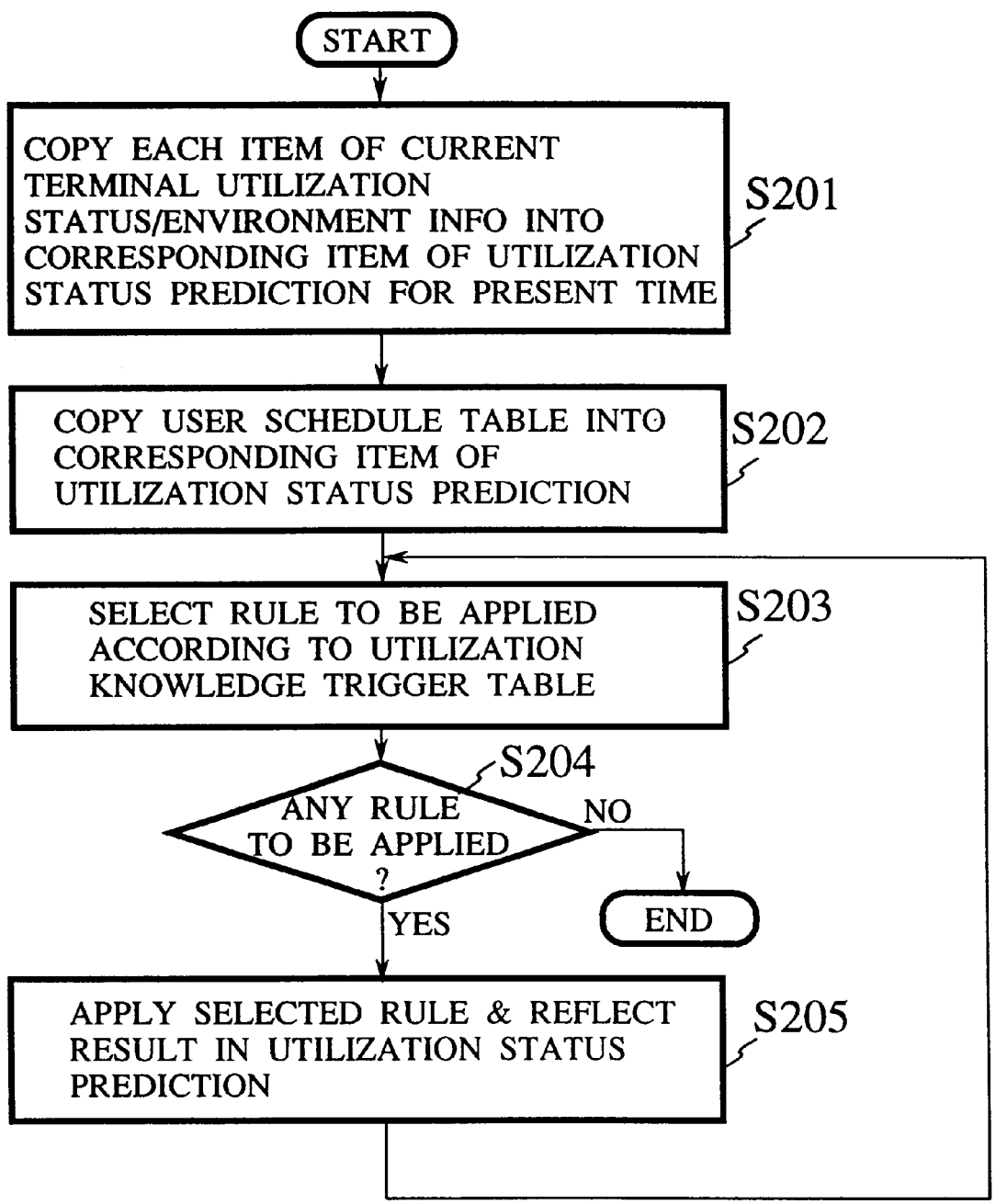

FIG.9

| UTILIZATION PREDICTION KNOWLEDGE | TRIGGERS FROM UTILIZATION STATUS | | | | | | | TRIGGERS FROM ACTION LIST | | |
|---|---|---|---|---|---|---|---|---|---|---|
| | TIME/TIME ZONE | PLACE | ACTIVITY/WORK | POSSIBILITY | DATA | APPLICATION | NETWORK ENVIRONMENT | TIME LIMIT | TASK | AMOUNT OF REMAINING WORK |
| R-1a | TIME A →<br>TIME B → | HOME<br>PLACE B | — | — | — | — | — | — | — | — |
| R-1b | TIME A →<br>TIME B → | PLACE A<br>PLACE B | — | — | — | — | — | — | — | — |
| R-2a | — | — | READ NEWSPAPER | — | NEWSPAPER | — | — | — | — | — |
| R-2b | — | — | MAKE CLIPPINGS | — | NEWSPAPER/MAGAZINE | — | — | — | — | — |
| R-2c | — | — | MAKE DOCUMENTS | — | WORD PROCESSOR DATA | — | — | — | — | — |
| R-3 | TIME | PLACE | — | — | — | — | — | — | — | — |
| R-4 | — | — | ACTIVITY/WORK | — | — | — | — | — | — | — |
| R-5 | (APPLICATION OF OTHER UTILIZATION PREDICTION KNOWLEDGE END) | | | | | | | | | |
| H-1a | — | — | GO TO WORK | — | — | — | — | — | READ NEWSPAPER | REMAINING WORK≠0 |
| H-1b | — | — | MOVE | — | — | — | — | — | READ NEWSPAPER | REMAINING WORK≠0 |
| H-1c | NEWSPAPER DELIVERY TIME | — | — | — | — | — | — | — | — | — |
| H-2 | — | — | — | — | — | — | — | — | TASK | REMAINING WORK≠0 |
| H-3a | 6:00-7:00 | — | OPEN | — | — | — | — | — | — | — |
| H-3b | 11:30-14:30 | — | OPEN | — | — | — | — | — | — | — |
| H-3c | 18:00-21:00 | — | OPEN | — | — | — | — | — | — | — |
| H-4 | — | HOME | — | — | — | — | — | — | — | — |

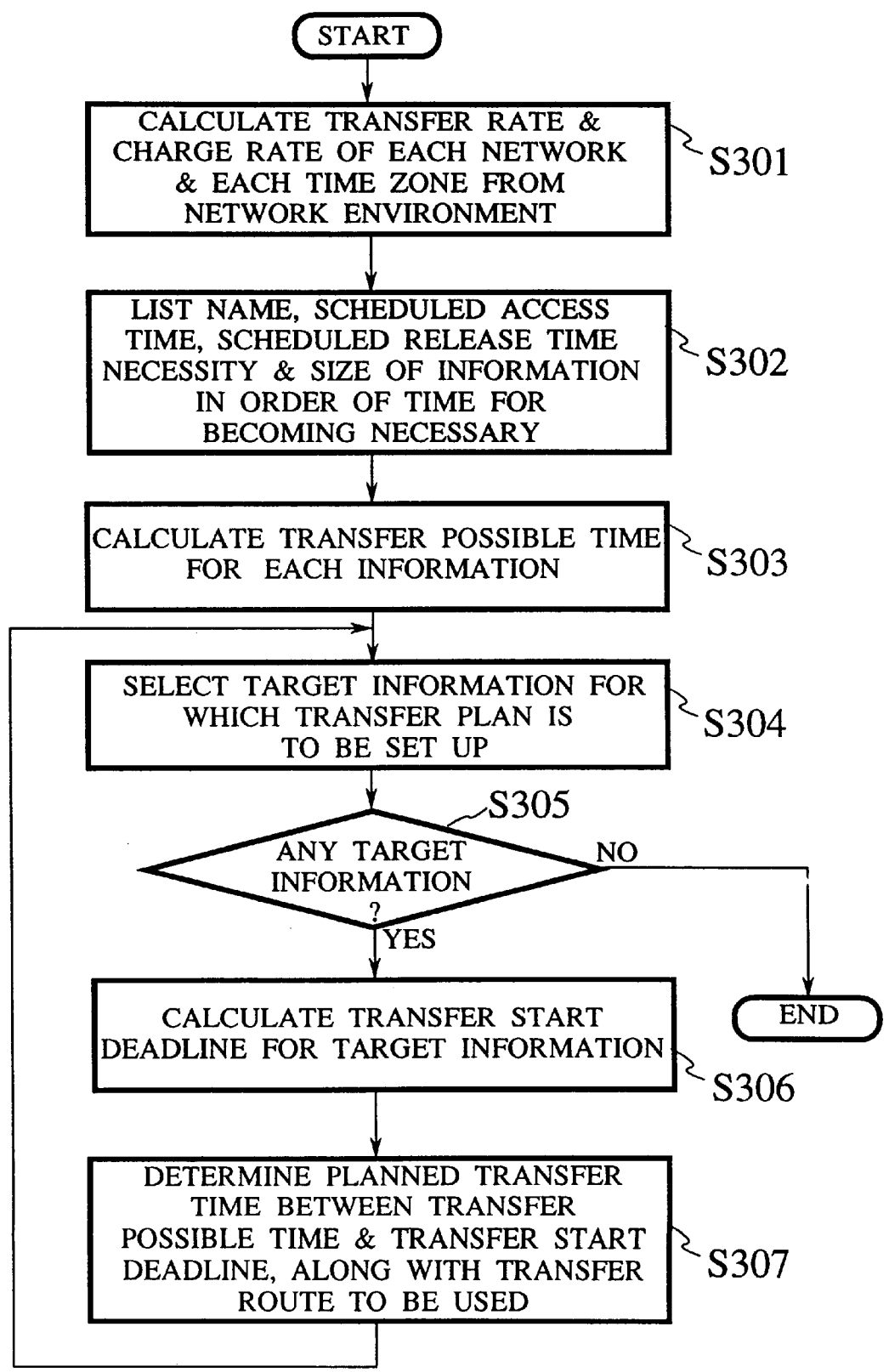

FIG.11

| TIME (TIME ZONE) | NETWORK ENVIRON-MENT | TRANSFER RATE | CHARGE RATE | CONNECTION POSSIBILITY |
|---|---|---|---|---|
| ≀ | ≀ | ≀ | ≀ | ≀ |

FIG.12

| INFORMA-TION NAME | TIME FOR BECOMING NECESSARY | TIME FOR BECOMING UNNECES-SARY | NECESSITY | SIZE | TRANSFER POSSIBLE TIME | DEADLINE | PLANNED TRANSFER TIME | TRANSFER ROUTE |
|---|---|---|---|---|---|---|---|---|
| ≀ | ≀ | ≀ | ≀ | ≀ | ≀ | ≀ | ≀ | ≀ |

| INFORMATION NAME | SIZE | TRANSFER DESTINATION | TRANSFER ROUTE |
|---|---|---|---|
| | | | |

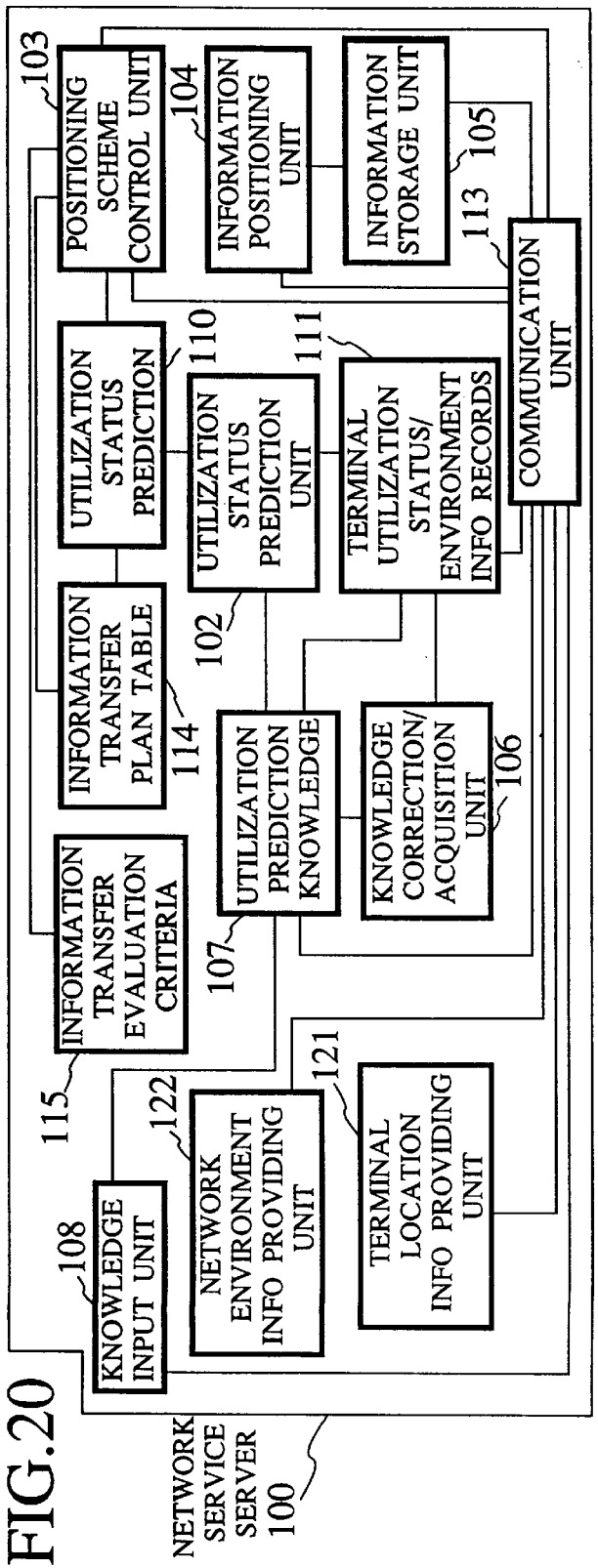
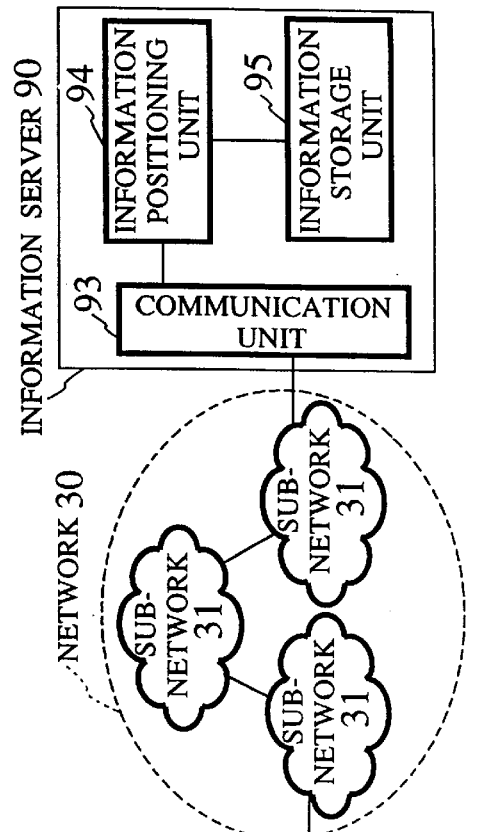
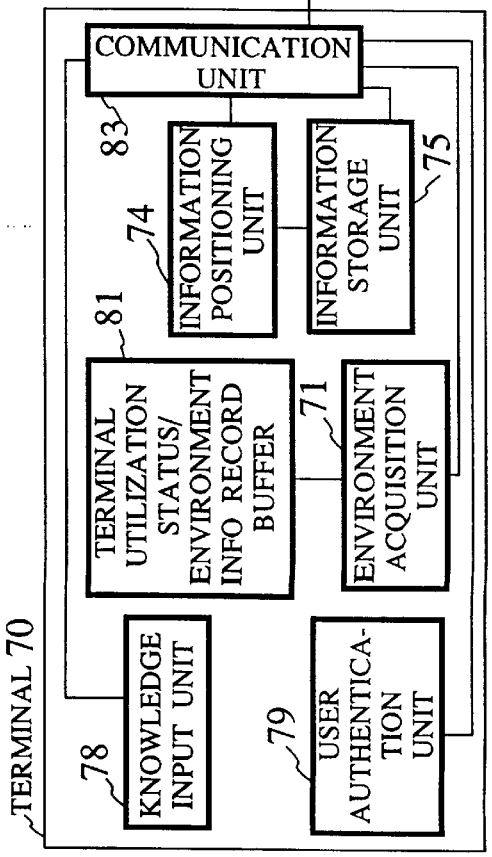
FIG.20

INFORMATION PROCESSING SYSTEM USING INFORMATION CACHING BASED ON USER ACTIVITY

This application is a continuation, of application Ser. No. 08/612,289, filed Mar. 7, 1996 U.S. Pat. No. 5,881,231.

BACKGROUND OF THE INVENTION

1. Field of the Invention

The present invention relates to an information processing system using a network for transferring information stored in one information processing device to another information processing device via a network.

2. Description of the Background Art

In recent years, the necessary technical background for realizing the information processing on a mobile terminal has been established by the advance of mobile communication and the reduction of information processing device size. A capacity of a memory medium to be provided in such a mobile terminal is limited by requirements for a movable size and a reasonable cost of the terminal, and it is usually difficult to store all the information required by a user in this memory medium with a limited capacity provided in the mobile terminal. For this reason, in order to realize the information processing on the mobile terminal, the memory medium of the mobile terminal is required to temporarily store only those information which are actually necessary in the information processing to be carried out at each moment, selectively out of all the information possessed by the user.

A conventionally known technique useful in such a situation is the caching technique which will now be described briefly.

Here, consider a case of an information processing device having an information processing unit, a first memory medium, and a second memory medium, where the second memory medium has a relatively small capacity to which a high speed access from the information processing unit is possible, while the first memory medium has a relatively large capacity to which only a low speed access from the information processing unit is possible by means of an information positioning function provided between the first and second memory media.

In this case, the processing power of this information processing device is improved as information to be processed by the information processing unit is physically located on the second memory medium as a cache even though this information appears as if it is located on the first memory medium logically. In a case of carrying out the information processing in this information processing device, the information processing unit normally carries out the information processing with respect to information stored in the second memory medium, but when information necessary in this information processing does not exist in the second memory medium (a case of cache miss), typically, the information processing is interrupted, and in order to secure a sufficient space in the second memory medium, the information positioning function selects information to be withdrawn from the second memory medium, writes this selected information back into the first memory medium if this selected information has been changed, and transfers requested information stored in the first memory medium to the second memory medium. Then, the information processing is resumed using the requested information now stored in the second memory medium as a cache.

This type of information processing device includes: (1) a virtual memory computer having a main memory formed by RAM, a disk device to be used as a virtual memory, and a virtual memory management function; and (2) a distributed file system formed by a client computer having a file cache, a server computer functioning as a file server, a network connecting between the client and server computers, and a distributed file management function.

In such an information processing device, a critical issue is the prevention of a lowering of the processing power due to an interruption of the information processing caused by an occurrence of the cache miss, and to this end, several algorithms are known for determining the information positioning scheme that can increase a probability for the necessary information to exist on the second memory medium, i.e., a probability for a cache hit. Usually, information to be read into the second memory medium is specified (as the information processing unit explicitly requests information necessary at each moment in the usual on-demand scheme), so that information that can be replaced by a new information is determined among information existing in the second memory medium at each moment.

Representative examples of this kind of algorithm include: (1) the LRU (Least Recently Used) algorithm which replaces information for which the latest access is oldest among informations in the second memory medium; and (2) the FIFO (First-In First-Out) algorithm which replaces the oldest information among informations in the second memory medium. The FIFO algorithm is easier to realize, but less effective than the LRU algorithm.

The reason why this caching technique is effective is that the most information processings have temporal and spatial information access localities. The cache misses occur until a stable state with a certain locality is reached, but once the necessary information is read into the second memory medium, a stable state with very few cache miss can be maintained until a transition to a next state with another locality begins.

Now, it is possible to expect this caching technique to be useful in the above described situation encountered in the information processing on the mobile terminal, by identifying the above described second memory medium with a memory medium provided in the mobile terminal, and the above described first memory medium with a memory medium provided in an information processing device (such as a file server in the home environment of the user, for example) which is storing all the information required by the user and which is accessible via a network. However, when the above described caching technique is applied to the mobile environment straightforwardly, the following problem arises.

Namely, in a case of the information processing on the mobile terminal, the mobile terminal and the server computer are to be connected via a network, but an availability of this network for the mobile terminal, and an available condition of this network such as an available bandwidth and a fee charged for use of this network in a case this network is available, are dependent on the environment at a destination moved by the mobile terminal which changes according to the activity of the user. Consequently, the case for the cache processing required in the case of a cache miss will vary at different times depending on the activity of the user. In the mobile environment, it can be expected that a state in which this cost remains high will continue for a long time, and therefore it will be necessary to prevent an occurrence of a cache miss during this period.

However, in the conventional caching technique, information to be replaced is determined by estimating information to be accessed in near future according to the records of past information accesses, so that there is a high probability for the cache miss to occur frequently at the time of making a transition from a state with a certain locality to another state with a different locality. In addition, every time the user changes the content of his work conducted on the mobile terminal, information to be accessed by the mobile terminal also change, so that in the conventional caching technique, there is also a high probability for the cache miss to occur many times while the cost for the cache processing is high. Consequently, the straightforward application of the conventional caching technique would cause the considerable increase of the information transfer time and the network utilization fee, which can be a major factor for damaging the utility and convenience of the information processing device from the user's point of view.

In other words, the conventional caching technique lacks any consideration for the variation in time of the cost required for the cache processing that can be caused by the activity of the user of the mobile terminal, and therefore the straightforward application of this conventional caching technique to the information processing on the mobile terminal would considerably damage the utility and convenience from the user's point of view due to the cache miss occurring while the cost for the cache processing is high.

SUMMARY OF THE INVENTION

It is therefore an object of the present invention to provide an information processing system in which the necessary information can be transferred via a network by the time this information becomes actually necessary, without damaging the utility and convenience from the user's point of view, even in a case in which the cost for the cache processing varies in time due to the activity of the user of the mobile terminal.

According to one aspect of the present invention there is provided an information processing apparatus to be connected to a network in order to receive a transfer of information via the network from an information management apparatus storing various informations, comprising: prediction means for predicting a necessary information which will be required by a user in future and a necessary time by which the necessary information will be actually required by the user, according to a first knowledge concerning an activity schedule of the user and a second knowledge concerning a relationship between a user's activity and an attribute of information; transfer control means for requesting the transfer of the necessary information to the information management apparatus via the network such that the necessary information will be received by the necessary time; and storage means for storing the necessary information transferred via the network.

According to another aspect of the present invention there is provided an information transfer control apparatus for realizing an information transfer to a first information processing apparatus from a second information processing apparatus via a network, comprising: prediction means for predicting a necessary information which will be required by a user using the first information processing apparatus in future and a necessary time by which the necessary information will be actually required by the user, according to a knowledge concerning an activity schedule of the user; and transfer control means for controlling the transfer of the necessary information from the second information processing apparatus to the first information processing apparatus via the network such that the necessary information will be transferred by the necessary time.

According to another aspect of the present invention there is provided a method of information transfer to a first information processing apparatus from a second information processing apparatus via a network, comprising the steps of: providing a first knowledge concerning an activity schedule of a user using the first information processing apparatus and a second knowledge concerning a relationship between a user's activity and an attribute of information; predicting a necessary information which will be required by the user in future and a necessary time by which the necessary information will be actually required by the user, according to the first and second knowledges; and controlling the transfer of the necessary information from the second information processing apparatus to the first information processing apparatus via the network such that the necessary information will be received by the necessary time at the first information processing apparatus.

According to another aspect of the present invention there is provided a method of information transfer to a first information processing apparatus from a second information processing apparatus via a network, comprising the steps of: providing a knowledge concerning an activity schedule of a user using the first information processing apparatus; predicting a necessary information which will be required by a user using the first information processing apparatus in future and a necessary time by which the necessary information will be actually required by the user, according to the knowledge concerning an activity schedule of the user; and controlling the transfer of the necessary information from the second information processing apparatus to the first information processing apparatus via the network such that the necessary information will be transferred by the necessary time.

According to another aspect of the present invention there is provided a method of information transfer to a first information processing apparatus from a second information processing apparatus via one of a plurality of networks available, comprising the steps of: providing a first knowledge concerning an activity schedule of a user using the first information processing apparatus and a second knowledge concerning a relationship between a location of the first information processing apparatus and an available network; predicting a future location of the first information processing apparatus according to the first knowledge; determining a transfer time and a network to be used for the transfer of information according to the future location and the second knowledge; and controlling the transfer of information from the second information processing apparatus to the first information processing apparatus according to the determined transfer time and network to be used.

According to another aspect of the present invention there is provided an article of manufacture, comprising: a computer usable medium having computer readable program code means embodied therein for causing a computer to function as a system for controlling an information transfer to a first information processing apparatus from a second information processing apparatus via a network, the computer readable program means including: first computer readable program code means for causing the computer to provide a first knowledge concerning an activity schedule of a user using the-first information processing apparatus and a second knowledge concerning a relationship between a user's activity and an attribute of information; second computer readable program code means for causing the computer to predict a necessary information which will be required by the user in future and a necessary time by which the necessary information will be actually required by the user, according to the first and second knowledges; and third computer readable program code means for causing the computer to control the transfer of the necessary information from the second information processing apparatus to the first information processing apparatus via the network such that the necessary information will be received by the necessary time at the first information processing apparatus.

According to another aspect of the present invention there is provided an article of manufacture, comprising: a computer usable medium having computer readable program code means embodied therein for causing a computer to function as a system for controlling an information transfer to a first information processing apparatus from a second information processing apparatus via a network, the computer readable program means including: first computer readable program code means for causing the computer to provide a knowledge concerning an activity schedule of a user using the first information processing apparatus; second computer readable program code means for causing the computer to predict a necessary information which will be required by a user using the first information processing apparatus in future and a necessary time by which the necessary information will be actually required by the user, according to the knowledge concerning an activity schedule of the user; and third computer readable program code means for causing the computer to control the transfer of the necessary information from the second information processing apparatus to the first information processing apparatus via the network such that the necessary information will be transferred by the necessary time.

According to another aspect of the present invention there is provided an article of manufacture, comprising: a computer usable medium having computer readable program code means embodied therein for causing a computer to function as a system for controlling an information transfer to a first information processing apparatus from a second information processing apparatus via one of a plurality of networks, the computer readable program means including: first computer readable program code means for causing the computer to provide a first knowledge concerning an activity schedule of a user using the first information processing apparatus and a second knowledge concerning a relationship between a location of the first information processing apparatus and an available network; second computer readable program code means for causing the computer to predict a future location of the first information processing apparatus according to the first knowledge; third computer readable program code means for causing the computer to determine a transfer time and a network to be used for the transfer of information according to the future location and the second knowledge; and fourth computer readable program code means for causing the computer to control the transfer of information from the second information processing apparatus to the first information processing apparatus according to the determined transfer time and network to be used.

Other features and advantages of the present invention will become apparent from the following description taken in conjunction with the accompanying drawings.

BRIEF DESCRIPTION OF THE DRAWINGS

FIG. 3 is a diagrammatic illustration of a terminal utilization status/environment information record used by the information processing system of FIG. 1.

FIG. 4 is a diagrammatic illustration of a trigger table used in the information processing system of FIG. 1.

FIG. 5 is a diagrammatic illustration of a user schedule table used in the information processing system of FIG. 1.

FIG. 6 is a diagrammatic illustration of an action list used in the information processing system of FIG. 1.

FIG. 7 is a diagrammatic illustration of a utilization status prediction used in the information processing system of FIG. 1.

FIG. 8 is a flow chart for the processing carried out by a utilization status prediction unit in the information processing system of FIG. 1.

FIG. 9 is a diagrammatic illustration of a prediction knowledge trigger table used in the information processing system of FIG. 1.

FIG. 10 is a flow chart for the processing carried out by a positioning scheme control unit in the information processing system of FIG. 1.

FIG. 11 is a diagrammatic illustration of a network environment table used in the information processing system of FIG. 1.

FIG. 12 is a diagrammatic illustration of an information transfer plan table used in the information processing system of FIG. 1.

FIG. 20 is a block diagram of the second embodiment of an information processing system according to the present invention.

DETAILED DESCRIPTION OF THE PREFERRED EMBODIMENTS

Referring now to FIG. 1 to FIG. 19, the first embodiment of the information processing system according to the present invention will be described in detail.

In the present invention, information stored in one memory device (memory unit) is transferred to another memory device (memory unit) via a network. Here, information to be transferred is essentially a sequence of bits indicating either 0 or 1 that are grouped together, but in terms of its content, the information can include a program such as an application program that can be executed (or can be made executable) as well as numerical and/or text data which are to be handled by the application program. In the following, the numerical and/or text data will be simply referred to as data, and data or application program will be generically referred to as an information.

Figure 1:
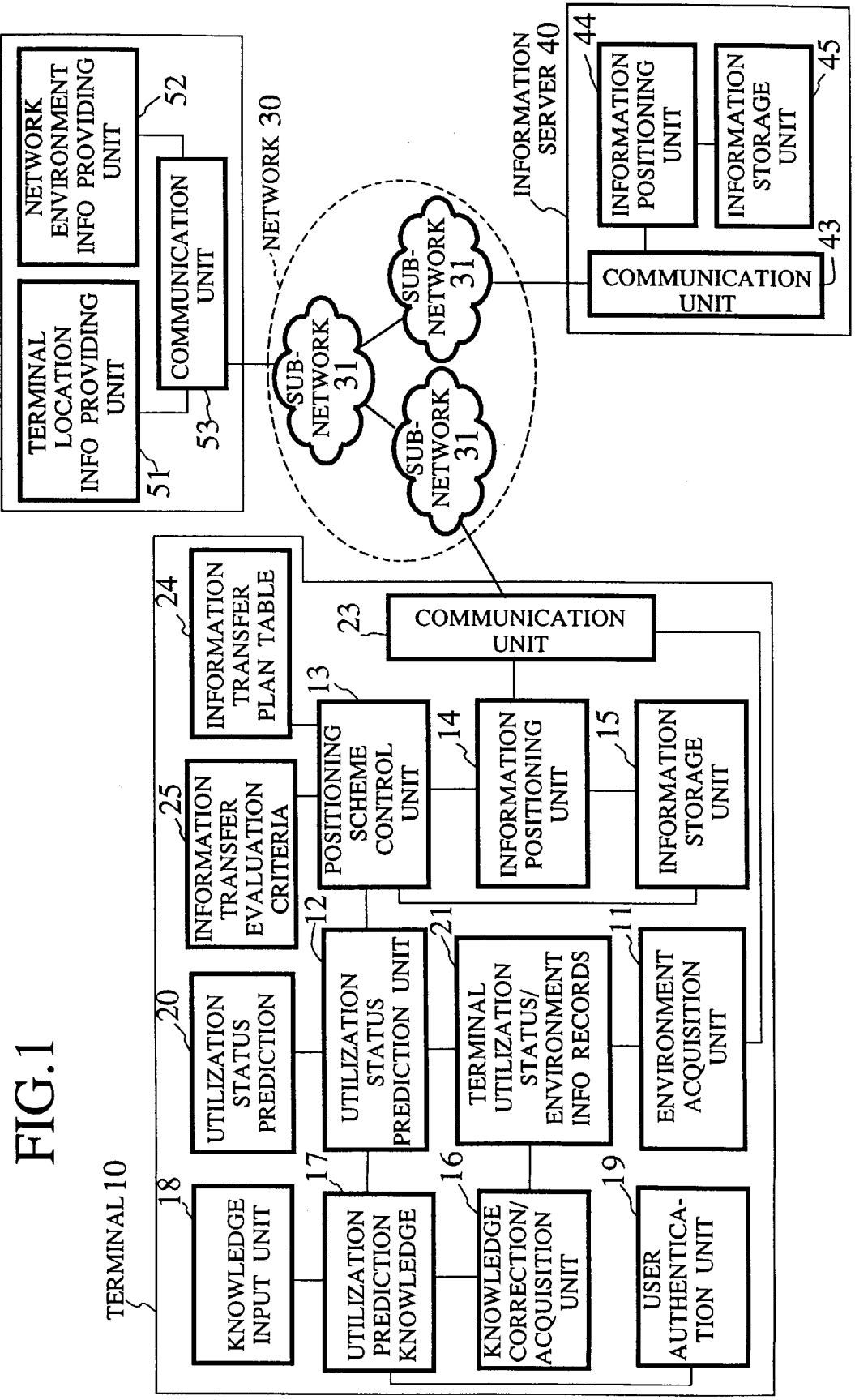
FIG. 1 is a block diagram of the first embodiment of an information processing system according to the present invention.

In the first embodiment, the information processing system has an overall configuration as shown in FIG. 1, which generally comprises a terminal 10, an information server 40, and a network service server 50, which are mutually connected through a network 30.

The terminal 10 includes an environment acquisition unit 11, a utilization status prediction unit 12, a positioning scheme control unit 13, an information positioning unit 14, a (first) information storage unit 15, a knowledge correction/acquisition unit 16, a utilization prediction knowledge 17, a knowledge input unit 18, a user authentication unit 19, a utilization status prediction 20, terminal utilization status/environment information records 21, a communication unit 23, an information transfer plan table 24, and information transfer evaluation criteria 25, each of which will be described in detail below.

The information server 40 includes a communication unit 43, an information positioning unit 44, and a (second) information storage unit 45, each of which will be described in detail below.

The network service server 50 includes a terminal location information providing unit 51, a network environment information providing unit 52, and a communication unit 53, each of which will be described in detail below.

The network 30 may be constructed by a single network, but in general, this network 30 is constructed by interconnection of sub-networks 31 such as radio or wired public networks, local networks, etc. as shown in FIG. 1.

The terminal 10 is a mobile terminal such as a portable terminal, for which the sub-network 31 to be used for a connection between the terminal 10 and the information server 40 changes depending on time and place. In addition, depending on an activity of the user, there may be a relatively long period of time during which the terminal 10 is not connected to the network 30.

The work on the terminal 10 by the user is carried out as the application executed on the terminal 10 makes accesses, additions, and/or changes to the information. The executable program given in a form of the application and the data may contain those which are permanently stored in the information storage unit 15, as well as those which are normally stored in an external device having an information storage function, such as the information storage unit 45 in the information server 40 for example, and which are stored into the information storage unit 15 in the terminal 10 as a result of the transfer of data and programs realized by activating the information positioning units 14 and 44 at appropriate timings. However, because of the requirements for a mobile size and a reasonable cost of the terminal 10, the capacity of the information storage unit 15 of the terminal 10 is usually limited. Consequently, the latter scheme will be used for most of the data and the programs.

As noted above, the network environment in which the terminal 10 is connected to the network 30 can be changed depending on time and place, so that if the information transfer is carried out at a timing where the user requests the information (data or program) necessary for the work, there can be cases in which the information transfer time becomes long (such as a case of the narrow bandwidth and a case of the low quality) or cases in which the information transfer fee becomes high (such as a case of the terminal 10 far distanced from the information server 40 when the charge rate accounts for distance and a case of using a sub-network 31 with a high charge rate), and therefore the utility and convenience of the user can be damaged severely. For this reason, in order to avoid such circumstances, it is effective to predict the information which will be required by the user in future, and transfer the predicted information to the information storage unit 15 in the terminal 10 at a timing where the network environment is suitable for the information transfer from a point of view of the utility and convenience of the user.

Figure 13:
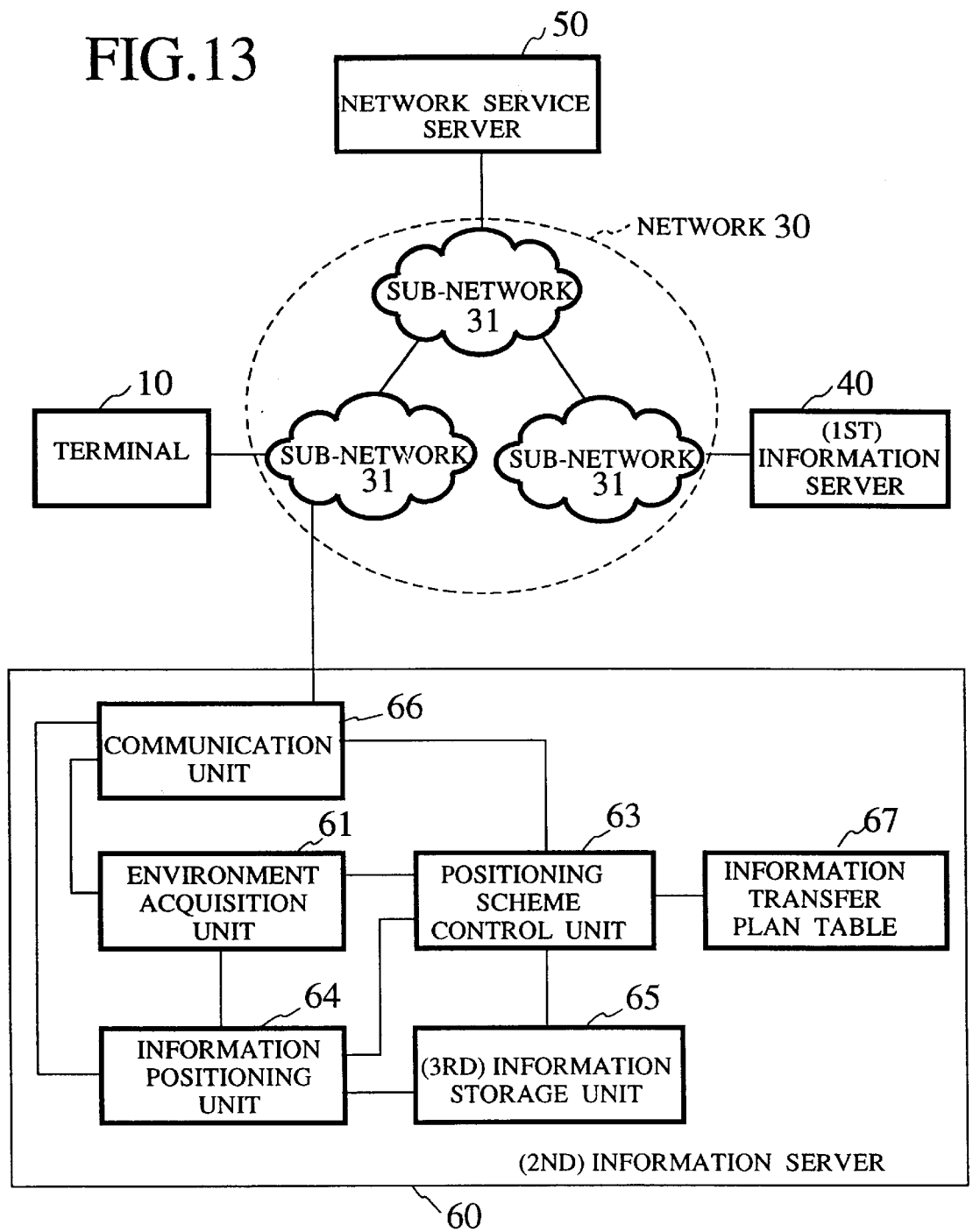
FIG. 13 is a block diagram of a modified system configuration for the information processing system of FIG. 1.

Note here that, as shown in FIG. 13 which will be described in detail later, it is also effective to provide a second information server 60 having a third information storage unit 65, and transfer the predicted information to this third information storage unit 65 at appropriate timing. Namely, there can be cases in which it is possible to provide a network environment which is capable of realizing the more preferable information transfer from the point of view of the utility and convenience of the user by means of the information transfer from the second information storage unit 45 to the third information storage unit 65, the temporal storage at the third information storage unit 65, and the subsequent information transfer from the third information storage unit 65 to the first information storage unit 15, rather than the direct information transfer from the second information storage unit 45 to the first information storage unit 15. This third information storage unit 65 functions to handle the transfer of the information (data or program) for which this is predicted to be the case at present or at some point in future.

Here, the point of view of the utility and convenience of the user is not a simple-minded one based on a single evaluation criterion alone, such as "the immediate transfer is to be made for the information which is predicted to be necessary at a timing where the transfer is possible". Rather, this point of view is a more sophisticated one for indicating the preference of the user according to a plurality of evaluation criteria, such as "the transfer is to be made at a timing of a lower charge rate in a case where a sufficient time margin can be expected until the actual utilization of the information by the user" and "the transfer is to be made even at a timing of a higher charge rate in order to secure the availability of the necessary information by the time of the actual utilization of the information by the user".

Now, in this first embodiment, in order to realize the information transfer as described above, the following functions are provided.

First, the utilization status prediction unit 12 is provided in order to predict "which information will be required by the user at which timing" and "what kind of a network environment will be available". This utilization status prediction unit 12 predicts the utilization status/environment of the terminal in future which changes according to the user activity, on a basis of the utilization prediction knowledge 17. More specifically, the utilization status/environment indicates the information which should be stored in the terminal 10 as it will be required by the user, the network environment which can be utilized by the terminal 10, etc. The utilization prediction knowledge 17 contains a user schedule table indicating the scheduled activities of the user, an action list specifying what should be done by the user by what time, a knowledge concerning habits indicating the tendency in the activities of the user, a knowledge concerning general prediction rules, etc.

Second, the positioning scheme control unit 13 is provided in order to set up a plan of the information transfer as to "which information should be transferred at what timing using which network" according to the prediction made by the utilization status prediction unit 12, and carry out an appropriate information transfer by controlling the information positioning unit 14.

Third, the environment acquisition unit 11 is provided in order to acquire the terminal utilization status/environment information, for the purpose of obtaining the initial condition for predicting the activity of the user and the utilization status/environment of the terminal in future, and recognizing the activity of the user and the utilization status/environment of the terminal at present and checking whether the prediction was correct or not. Here, the activity of the user is estimated from the terminal utilization status/environment information.

Fourth, the knowledge correction/acquisition unit 16 is provided in order to correct the utilization prediction knowledge 17 and to extract a new knowledge. When the activity of the user turned out to be different from the prediction, the utilization prediction knowledge 17 used in making the prediction is corrected, or a new utilization prediction knowledge 17 which was missing in making the prediction is added. Also, when the activity of the user turned out to be as predicted, the certainty of the utilization prediction knowledge 17 used in making the prediction is raised.

Fifth, the knowledge input unit 18 is provided in order to allow the user to enter additions and/or corrections to the utilization prediction knowledge 17 interactively, as the utilization prediction knowledge 17 includes information characteristic to the user such as user's schedule, user's habits, etc.

Now, the regular processing of this information processing system of FIG. 1 is carried out according to the flow chart of FIG. 2 as follows.

In outline, when the utilization is started (step S101), the user related information is initialized (step S102), and the monitoring of the terminal utilization status/environment is carried out (step S103). As long as there is no change in the monitored terminal utilization status/environment (step S104 NO), this monitoring at the step S103 will be continued. On the other hand, when there is a change in the monitored terminal utilization status/environment (step S104 YES), if it is a utilization finish request (step S105 YES), the processing is finished (step S112), whereas otherwise (step S105 NO), a content of change is recorded (step S106), the utilization prediction knowledge is corrected (step S107), the terminal utilization status is predicted (step S108), and the information positioning scheme is planned (step S109). As a result of this planning, when the information positioning is unnecessary (step S110 NO), the processing returns to the monitoring at the step S103, whereas when the information positioning is necessary (step S110 YES), the information positioning processing is carried out (step S111) and then the processing returns to the monitoring at the step S103.

In the following, each step of this regular processing according to the flow chart of FIG. 2 as outlined above will be described in greater detail one by one.

[Step S101]

The utilization of the terminal 10 by the user is started by the user authentication such as that using a combination of a user name and a password which is done by the user authentication unit 19. This user authentication also serves for the purpose of preventing the erroneous leak of the information to persons other than the legitimate user. For example, in a case of carrying out the information transfer between the first information storage unit 15 and the second information storage unit 45, this user authentication imposes a limitation to carry out the information transfer within a range of the access rights assigned to the authenticated user.

[Step S102]

Among user related information such as the utilization prediction knowledge 17 which are different for different users, those corresponding to the authenticated user are selected and initialized. For example, when the utilization prediction knowledge relevant for the authenticated user is present only in the second information storage unit 45 and not in the terminal 10, the information positioning unit 14 is controlled to transfer this utilization prediction knowledge to the terminal 10, and set it as the utilization prediction knowledge 17 to be used in the subsequent prediction.

[Step S103]

In order to monitor the terminal utilization status/environment, the terminal utilization status/environment information is acquired by the environment acquisition unit 11. Here, the terminal utilization status/environment information include date and time, a current location of the terminal 10, applications activated on the terminal 10, data accessed by the applications, and an environment (network environment) of a network to which the terminal 10 is currently connected or capable of being connected.

This function to acquire the terminal utilization status/environment information can be realized in the following manner, for example.

In order to acquire the date and time, either a clock or a GPS (Global Positioning System) is provided within the terminal 10.

The execution of the application on the terminal 10 and the accesses to the informations managed in forms of files are usually managed by an operating system. In such a case, the functions of the operating system are supplemented by a function to inquire applications currently activated and information accessed by each application.

In order to acquire the current location of the terminal 10, the network service server 50 is provided with the terminal location information providing unit 51 for providing a response to a terminal which issued an inquiry, where the response indicates a location information for this terminal. Here, as the location information, relatively physical information (such as latitude, longitude, altitude, a number assigned to a connection point of the terminal 10 and the network 30, etc.) and relatively logical information (such as the name of a building, the name of a train line, etc.) can be considered, but the logical information is more often useful, so that the terminal location information providing unit 51 is supposed to be capable of providing the logical location information here.

The physical terminal location can be recognized at the network side from a connection point of the terminal 10 and the network 30 in the case of a wired network, or from a cell containing the terminal 10 in the case of a radio network. Also, when the terminal 10 has means such as the GPS for providing information on latitude, longitude, altitude, etc., the physical terminal location can be recognized at the terminal side. The terminal location information providing unit 51 returns the response containing the logical location information derived from the physical location information so obtained according to prescribed information for making correspondence between the physical location information and the logical location information, as well as the physical location information itself if necessary.

In addition, the terminal location information providing unit 51 returns a response with respect to an inquiry using two different sets of location and time as a key, where the response indicates possible means for moving between these two locations during a period between these two times, and the location information during the moving.

In order to acquire the environment of the network 30 to which the terminal 10 is connected, the network service server 50 is provided with the network environment information providing unit 52. In response to an inquiry from a terminal specifying the logical or physical location and the time or time zone, this network environment information providing unit 52 refers to prescribed information for obtaining the network environment corresponding to the specified location and time/time zone, and returns to this terminal a response indicating the network environment information that is obtained, or expected to be obtained, under the specified situation.

The content of the network environment information includes time independent information such as network type, maximum bandwidth, maximum quality, fixed network utilization cost, charging rule, connection possibility (i.e., whether it is possible to connect to the network or not), etc., as well as time dependent information such as available bandwidth at each time, available quality at each time, required cost at each time, connection possibility reflecting a congestion state (the amount of traffic) of the network at each time (i.e., a probability by which it is possible to connect to the network), etc.

[Step S104]

The environment acquisition unit 11 compares each item in the terminal utilization status/environment information acquired by the current execution of the step S103 with each item in the immediately previous terminal utilization status/environment information record 21 (see FIG. 3 described below) that was acquired by the immediately previous execution of the step S103, and if there is any change, the processing proceeds to the next step S105, whereas if there is no change, the processing returns to the step S103 after the delay of a prescribed period of time.

Here, it is to be noted that the change to be detected in the date and time item is to be limited only to what is registered in advance such as a change related to the habit (H-1), to be described later. Note also that, in the case of executing this step S104 for the first time, there is no previous terminal utilization status/environment information record 21 to compare with so that all the items are to be regarded as changed.

[Step S105]

Figure 2:
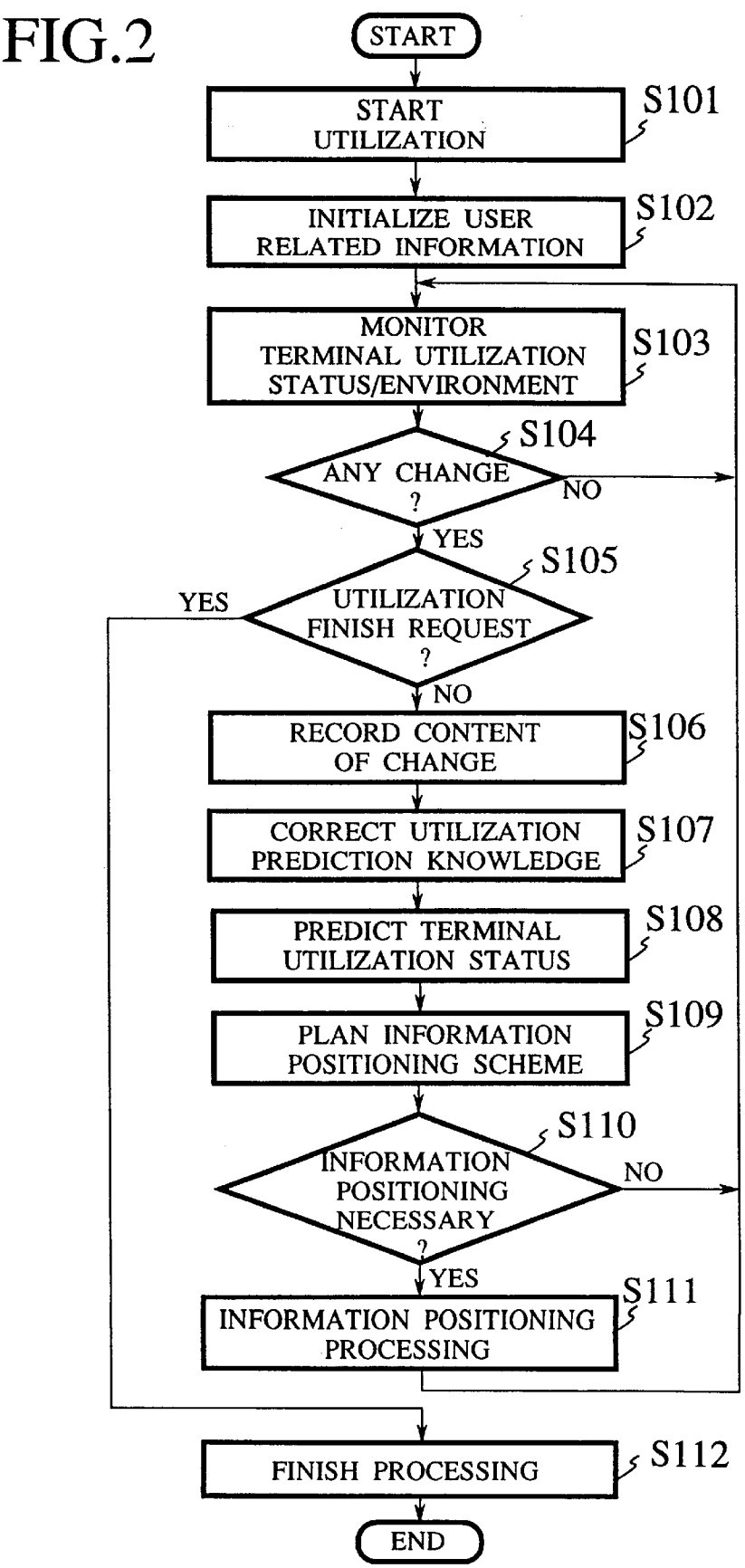
FIG. 2 is a flow chart for the regular processing carried out by the information processing system of FIG. 1.

When the change detected at the step S104 indicates the terminal utilization finish request from the user, the regular processing according to the flow chart of FIG. 2 is terminated. Otherwise, the processing proceeds to the next step S106.

[Step S106]

The environment acquisition unit 11 records the content of change for the changed items in the terminal utilization status/environment information detected at the step S104, along with the unchanged items (to each of which an explicit note "NO CHANGE" is added to its content), as the terminal utilization status/environment information record 21. FIG. 3 shows an exemplary format for this terminal utilization status/environment information record 21, which includes such items as date and time, place, data, application, and network environment.

[Step S107]

According to the change in the terminal utilization status/environment information, the utilization prediction knowledge 17 is corrected or added by the knowledge correction/acquisition unit 16. As an exemplary manner for realizing this knowledge correction/acquisition unit 16, it is possible to apply a knowledge correction/acquisition rule according to the changed item, by providing a trigger table registering a list of rules to be called up for each item as shown in FIG. 4 along with a mechanism for calling up the rule relevant to each changed item. The utilization prediction knowledge 17 can then be corrected or added according to the applied rule. In FIG. 4, the trigger table includes such items as date and time, place, data, application, and network environment for each rule.

Here, the knowledge correction/acquisition rule can be given in the following exemplary format.

(Knowledge Correction/Acquisition Rule C-1)

Outline: When a certain application is finished, an amount of work done (see an action list shown in FIG. 6 and described below) for the work conducted by using this application is increased as much as the working time spent by the user using this application.

Triggering condition: A completion of the application.

Processing content: Estimate the work that had been conducted from a combination of the application and the data used, and select a corresponding work from the action list. Calculate a value in which the working time spent by the user using this application is added to the recorded amount of work done for the selected work, and enter the calculated value as a new value for the amount of work done in the action list.

[Step S108]

The utilization status prediction unit 12 predicts the future terminal utilization status according to the terminal utilization status/environment information and the utilization prediction knowledge 17, and produces the utilization status prediction 20. Here, the utilization prediction knowledge 17 includes the user schedule table as shown in FIG. 5, the action list specifying what should be done by the user by what time as shown in FIG. 6, the habit knowledges (such as H-1 to H-4 described below) indicating the tendency in the activities of the user, and the general prediction rules (such as R-1 to R-5 described below). In FIG. 5, the user schedule table includes such items as date and time, place, and content, whereas in FIG. 6, the action list includes such items as time limit, content, amount of work, amount of work done, and amount of remaining work. On the other hand, as shown in FIG. 7, the utilization status prediction 20 includes such items as time zone, place, activity/work, possibility for doing that activity/work, data to be accessed, application to be activated, and network environment of a network to be connected or capable of being connected.

The utilization status prediction unit 12 predicts each item of the utilization status prediction 20 of FIG. 7 as much as possible by utilizing the above noted utilization prediction knowledge 17.

Here, an exemplary processing by the utilization status prediction unit 12 is carried out according to the flow chart of FIG. 8 as follows.

(Step S201)

The contents of the items of the current terminal utilization status/environment information obtained at the step S103 including date and time, place, data, application, and network environment are copied into the corresponding items of the utilization status prediction 20 for the present time, on the first line of the utilization status prediction 20 for example.

(Step S202)

The contents of the items of the user schedule table of FIG. 5 in the utilization prediction knowledge 17 including date and time, place, and content from some past time to some future time are copied into the corresponding items of date and time, place, and activity/work, respectively, on the second and subsequent lines of the utilization status prediction 20.

Here, some past time is to be determined as a margin for a case where the user's actual activity delays from the activity schedule. For instance, some past time can be determined as a prescribed period of time (such as one hour) before a scheduled time that is recognized as a current time according to the prediction rule (R-5) described below by the previous execution of the step S108. Also, some future time is to be determined to contain at least the next time zone in which the network can be utilized at low cost. For instance, some future time can be determined as a time at which the user's activity of the day ends when it is possible to expect that the network can be utilized at low cost at a location where the user's activity of the day ends. At the time after the user's activity of the day is ended, some future time should be set as a time by which the user's activity is scheduled to end next day in this case.

(Step S203)

The content of each item of the utilization status prediction 20 has a possibility for being changed by the execution of the steps S201, S202, and S205. As there are cases in which an item predicted by a certain utilization prediction knowledge (i.e., changed according to the prediction) is needed as an input to another utilization prediction knowledge, there is a need to repeatedly select each relevant knowledge of the utilization prediction knowledge 17 and apply it, until there is no more utilization prediction knowledge that can be applied. Here, a prediction knowledge trigger table as shown in FIG. 9 is used, where the items for each utilization prediction knowledge in this prediction knowledge trigger table include triggers corresponding to the utilization status prediction 20 of FIG. 7 and triggers corresponding to the action list of FIG. 6.

Each item of the prediction knowledge trigger table of FIG. 9 is compared with each item of the utilization status prediction 20 of FIG. 7 for each time zone, and when the triggering condition for a certain utilization prediction knowledge coincides with the content of the item of the utilization status prediction 20 that was changed at an immediately previous timing, this certain utilization prediction knowledge is selected. For example, in a case where the place at a time A is a home, the place at a time B is an arbitrary place B, and these times A and B are timewise consecutive on the table of the utilization status prediction 20, the utilization prediction knowledge (R-1a) in the prediction knowledge trigger table of FIG. 9 will be selected.

In the initial execution of the step S203, there is a possibility for the change made at the step S201 or S202 to coincide with the triggering condition, and in the second and subsequent executions of the step S203, there is a possibility for the change made at the step S205 to coincide with the triggering condition. All the utilization prediction knowledge that satisfies the triggering condition is setected by a single execution of this step S203, so that there may be cases in which a plurality of utilization prediction knowledge are selected at the same time.

(Step S204)

When there is no more utilization prediction knowledge to be selected as a result of the step S203, the processing of this step S108 by the utilization status prediction unit 12 is ended.

(Step S205)

The utilization prediction knowledge selected at the step S203 is applied, and the utilization status prediction 20 is changed according to the result of applying this utilization prediction knowledge. After all the selected knowledge is applied, the processing returns to the step S203.

In this manner, the processing according to the flow chart of FIG. 8 can be realized.

In the following, some examples of the prediction rules R-1 to R-5 and the habit knowledges H-1 to H-4 constituting the utilization prediction knowledge shown in the prediction knowledge trigger table of FIG. 9 will be described one by one.

Prediction Rule (R-1)

Outline: When things to do at different times and different places are written in the schedule table, the prediction concerning the moving is made under the assumption that the user will move between these places during these times.

Triggering condition: A change in time/time zone and place.

Input: Place A corresponding to time A, and place B (different from the place A) corresponding to time B.

Output: Location and activity/work during the time zone from the time A to the time B, and its possibility.

Processing content: Set the activity/work as "go to work" when the place A is a home, or as "go home" when the place B is a home, or else as "move" otherwise. Inquire the terminal location information providing unit 51 of the network service server 50 via the environment acquisition unit 11 using (time A, place A) and (time B, place B) as a key, about the location (including the moving means such as a name of railway) and its possibility, and set the received response into the corresponding item.

Prediction Rule (R-2)

Outline: From a type of the data and the activity/work of the user, the application program which utilizes these data is predicted.

Triggering condition: A change in activity/work and data.

Input: Activity/work and data.

Output: Application.

Processing content: Check the type of the data from the attribute (such as a suffix of the file name, an existence in a particular directory, etc., for example) of the data. Determine the application for realizing the activity/work using the data from the correspondence table for the activity/work, data type, and application program, and add it to the item for the application (the previous content of the item for the application is not be erased by the overwriting).

Prediction Rule (R-3)

Outline: The network environment (a type of network, bandwidth, quality, fee, security, connection possibility, etc.) that can be obtained at a certain time and a certain place is predicted.

Triggering condition: A change in time/time zone and place.

Input: Time/time zone and place.

Output: Network environment.

Processing content: Inquire the network environment to the network environment information providing unit 52 of the network service server 50 via the environment acquisition unit 11 using time/time zone and place as a key, about the network environment, and set the received response to the item for the network environment.

Prediction Rule (R-4)

Outline: The data required by the user is predicted from the activity/work of the user.

Triggering condition: A change in activity/work.

Input: Activity/work.

Output: Data.

Processing content: Assume that the data are attributed to the activity/work in advance (the data are present within the directory corresponding to the activity/work, for example). Then, search for the data with the entered activity/work as a key, and set the search result to the item for the data.
Prediction Rule (R-5)
  Outline: The user schedule table is corrected according to the acquired terminal utilization status/environment. For example, a start or an end of the activity/work is set earlier than scheduled.
  Triggering condition: An end of application of other utilization prediction knowledge.
  Input: Date and time, place, data, application, and network environment in the first line and the second and subsequent lines.
  Output: Date and time, place, data, application, and network environment for the second and subsequent lines.
  Processing content: Compare each item of date and time, place, data, application, and network environment in the first line of the utilization status prediction (i.e., the acquired terminal utilization status/environment) with a corresponding item of the second and subsequent lines predicted according to the schedule table in time sequence order, and set the line in correspondence as the line for the present time. In addition, delete the lines corresponding to the time before the present time and the branches of the prediction different from that of the present time for the time after the present time.

The following is some examples of the habit knowledge of the user for which the triggering condition, input, and processing content can change depending on the habits of the user.
Habit Knowledge (H-1)
  Outline: According to the habit of the user, which newspaper is read by the user and when it is read by the user are predicted.
  Triggering condition: A change in activity/work, task, and amount of remaining work, and a change in time/time zone.
  Input: Date and time, activity/work, possibility, task, and amount of remaining work at a time of prediction.
  Output: Activity/work, data, application, and possibility.
  Processing content: In the case the date and time corresponds to a predetermined timing (here this time is registered in advance as a thing to be detected, even though the step S104 does not detect a change in date and time by the default setting), set the amount of work for "task=read newspaper" as a standard amount of work for the user to read the newspaper. This standard amount of work is calculated from statistical data of the activities of the user in the past (such as a mean value plus two times the standard deviation). When the activity/work includes "go to work" or "move", and the amount of remaining work for "task =read newspaper" is greater than 0, add "read newspaper" to the activity/work, add today's issue of the subscribed newspaper of the user to the data, and add a newspaper viewer to the application. When a time of prediction is earlier than a time for "go to work", set a large possibility for a time of "go to work" and a medium possibility for a time of "move" medium. Otherwise, set a large possibility for a time of "move".
Habit Knowledge (H-2)
  Outline: The activity/work is predicted from the user's habit for the work related to the task in the action list.
  Triggering condition: A change in task and amount of remaining work.
  Input: Date and time, activity/work, deadline, task, and amount of remaining work at a time of prediction.
  Output: Activity/work and possibility.
  Processing content: Assume that the habit of the user is that a possibility for carrying out the work related to the task while moving becomes high as the deadline approaches in view of the amount of remaining work for the task. Then, when a value in which an available work time obtained by subtracting the date and time of prediction from the deadline of a certain task is divided by the amount of remaining work is greater than threshold A, B, or C (A>B>C), set large, medium, or small possibility for carrying out the work related to that task as the activity/work, respectively.
Habit Knowledge (H-3)
  Outline: A possible prediction is made from the user's habit concerning the eating.
  Triggering condition: A change in time/time zone and activity/work.
  Input: Date and time and activity/work.
  Output: Activity/work and possibility.
  Processing content: Add "have a breakfast" as the activity/work to a time zone which is extending over 20 minutes continuously while the activity/work is open and which is between 6:00 to 7:00, and set a large possibility for it. Add "have a lunch" as the activity/work to a time zone which is extending over 30 minutes continuously while the activity/work is open and which is between 11:30 to 14:00, and set a large possibility for it. Add "have a dinner" as the activity/work to a time zone which is extending over 45 minutes continuously while the activity/work is open and which is between 18:00 to 21:00, and set a large possibility for it.
Habit Knowledge (H-4)
  Outline: A possible prediction is made from the user's habits while the user is at home.
  Triggering condition: A change in place.
  Input: Place.
  Output: Activity/work and possibility.
  Processing content: Assume that the user has a habit of not doing any work at the terminal while the user is at home. Then, when the place is a home, set the activity/work as open, and set a large possibility for it.
[Step S109]
  According to the produced utilization status prediction 20 and the information transfer evaluation criteria 25, the positioning scheme control unit 13 sets up an information transfer plan as to which data and/or application program should be transferred at what timing using which network, and updates the information transfer plan table 24. The conditions required for the information transfer plan are assumed to be: (i) the probability for being unable to obtain the information when it becomes necessary should be made small, and (ii) the information transfer cost (such as the transfer time and the fee) should be made small.

Considering a case of being ahead of the schedule in which there is a possibility for the information to become necessary earlier than predicted, it is desirable to remove the information which is no longer necessary from the first information storage unit 15 as quickly as possible, and store the information which is predicted to become necessary in future into a resulting empty region in the first information storage unit 15, in order to satisfy the above condition (i). However, it may not be possible to satisfy the above condition (ii) according to this simple strategy because there may be a case in which only the relatively expensive network environment is available at that moment. In order to satisfy the above condition (ii), it is desirable to delay the execution of the information transfer until the timing at which the less expensive network environment can be obtained, within a range of not increasing the probability for being unable to obtain the information in time too much.

Here, which one of the above conditions (i) and (ii) is to be weighted heavier to what extent can be set up freely by the user. Also, the above conditions (i) and (ii) are only examples of the evaluation criteria, and it is possible to use other evaluation criteria. It is also possible for the user to add, change, and/or select the evaluation criteria. These evaluation criteria are stored in the information transfer evaluation criteria 25.

Now, an exemplary procedure for the positioning scheme control unit 13 to set up the information transfer plan according to the above described strategy will be described with reference to the flow chart of FIG. 10. This procedure is what is to be called up under the usual circumstances. The information transfer plan is to be set up according to a different strategy in different circumstances, so that a different procedure is to be called up in such a case as will be described later. At a time of selecting the procedure, the criteria for selecting the procedure (which are expressed as modes described below, for example) stored in the information transfer evaluation criteria 25 are to be referred. An exemplary manner of utilizing these criteria will also be described later.

(Step S301)

From the network environment in the utilization status prediction 20 of FIG. 7, the transfer rate and the charge rate in each time zone are calculated. In a case where a plurality of network environments are available at a certain time zone, the transfer rate and the charge rate are calculated for each available network environment. The calculated result is then written into the corresponding item of a network environment table shown in FIG. 11.

(Step S302)

Information name, time for becoming necessary, time for becoming unnecessary, necessity, and size of the information (data and/or application program) are written into the information transfer plan table 24 as shown in FIG. 12, in an order of those no longer necessary, those currently used, and those predicted to become necessary in future (i.e., in a time sequence order of the time for becoming necessary), by referring to the utilization status prediction 20 of FIG. 7.

Here, the information which is no longer necessary is the information which is present in the information storage unit 15 of the terminal 10 but no longer necessary at this point. The time for becoming necessary is a time for a beginning of a time zone in which this data or application program appears in the corresponding item of the utilization status prediction 20, which is not given to the information which is no longer necessary and the information which is currently used. The time for becoming unnecessary is a time at which this data or application program disappears from the corresponding item of the utilization status prediction 20, which is not given to the information which is no longer necessary. The necessity is set to be identical to the possibility of the activity/work at a time this information becomes necessary. The necessity is set to be "NULL" for the information which is no longer necessary, while the necessity is set to be large for the information which is currently used. The size of the information is to be obtained from the information storage unit 15 by means of an inquiry using the information name as a key.

(Step S303)

The transfer possible time by which the information transfer becomes possible for the first time is calculated for each information which is predicted to become necessary in future, from a memory capacity of the information storage unit 15 of the terminal 10 and the time for becoming necessary, time for becoming unnecessary, and size of each information. Assuming that each information is to be transferred and added in a time sequence order of time for becoming necessary to the information present in the information storage unit 15 at a certain time, this certain time is written into the item for the transfer possible time in the information transfer plan table 24 of FIG. 12.

Here, however, in a case where the necessary information is already present in the information storage unit 15 after being stored there in the past, this remaining information is to be utilized and therefore the transfer possible time will not be given. In a case where the available capacity of the information storage unit 15 is in short, the unnecessary information stored in the information storage unit 15 at that point is removed from the information storage unit 15, in an order of lateness of time for each information to become necessary again, until it becomes possible to transfer the necessary information. In a case where there is no information which is no longer necessary at that point, the planned time is displaced to the later time until a sufficient number of information which are no longer necessary appear. The processing to remove the information from the information storage unit 15 is carried out by the execution of the step S111 at the corresponding timing.

When a time at which the information transfer becomes possible cannot be found (i.e., it becomes later than the time by which the information becomes necessary), it implies that the amount of information to be stored in the information storage unit 15 at the same time is too much. In this case, the information with a lower necessity than the information to be transferred is sequentially selected from the information to be stored in the information storage unit 15 at that point, and treated similarly as the information which is no longer necessary in the manner described above, in an attempt to increase the available capacity of the information storage unit 15 at that time.

In the next steps S304 to S307, the transfer plan for each information is set up. These steps S304 to S307 are repeatedly carried out by sequentially selecting the information which is predicted to become necessary in future, in an order opposite to a time sequence order of the time for becoming necessary.

(Step S304)

In the initial execution of this step S304, the information which is predicted to become necessary last will be selected as a target information for which the transfer plan is to be set up.

In each of the second and subsequent executions of this step S304, the information which is predicted to become necessary immediately before the information selected by the immediately previous execution of the step S304, and to which the transfer possible time is given, will be selected as a target information for which the transfer plan is to be set up.

(Step S305)

When the planned transfer time is already determined for every information which is predicted to become necessary in future, the processing is ended, whereas otherwise the processing proceeds to the next step S306.

(Step S306)

From the transfer rate of the information obtained at the step S301, the time by which each information is predicted to become necessary, or the planned transfer time for another information determined at the immediately previous execution of the step S307, the transfer start deadline which is the time by which the transfer should be started at the latest in order to be able to transfer the necessary information to the information storage unit 15 before this information becomes necessary is calculated.

First, the time by which the target information becomes necessary and the planned transfer time determined at the immediately previous execution of the step S307 are compared, and the earlier time is set as a time A. Here, in a case where the step S307 has not been executed yet, the time by which the target information is predicted to become necessary is set as a time A. Next, the transfer time is calculated by dividing the size of the target information by the transfer rate, and the transfer start deadline is set to be a result of subtracting the calculated transfer time from the time A.

Here, in order to transfer the target information, when the information to be removed from the information storage unit 15 of the terminal 10 has been updated, it is necessary to write this information back to the information storage unit 45 of the information server 40 by the execution of the step Slll at that time. When there is a possibility for this to be the case, the transfer time for the information to be written back is also subtracted from the time A in determining the transfer start deadline for the target information.

A possibility for being ahead of the schedule can be taken into consideration by setting up the deadline as follows, instead of the above described, for example. Namely, the transfer possible time is subtracted from the time by which the information becomes necessary, and the result of this subtraction is multiplied by a certain margin with a value in a range of 0 to 1. Then, the result of this multiplication is added to the transfer possible time, and the resulting time is set as the time by which the information becomes necessary with a margin. Apart from this, the deadline is determined in the same manner as described above. For example, the transfer start deadline is unchanged when the margin is 1, and the transfer possible time becomes the transfer start deadline when the margin is 0. In this case, it should be made possible for the user to set up this margin desirably by using the knowledge input unit 18. This margin will be stored as a part of the information transfer evaluation criteria 25.
(Step S307)

From the transfer possible time, the transfer start deadline, the charge rates during the period between them, the connection possibilities, and the transfer rates of the target information of the current execution of this step S307, the planned transfer time for actually transferring this information is determined along with the transfer route to be used. The planned transfer time is determined by searching out a time zone between the transfer possible time and the transfer start deadline at which the charge rate is low and the connection possibility is high, and by subtracting the transfer time obtained by dividing the size of the information by the transfer rate at that point from the earlier one of the end time of the searched out time zone and the planned transfer time obtained by the immediately previous execution of this step S307. The determined planned transfer time and the transfer route are then entered into the information transfer plan table of FIG. 12.

Here, in order to transfer the target information, when the information to be removed from the information storage unit 15 of the terminal 10 has been updated, it is necessary to write this information back to the information storage unit 45 of the information server 40 by the execution of the step Slll at that time. When there is a possibility for this to be the case, the transfer time for the information to be written back is also subtracted in determining the planned transfer time for the target information.

In a case where the network environment at the resulting planned transfer time is the same as the currently available network environment and this same network environment is predicted to be available continuously, the present time is set as the planned transfer time.

In a case where the transfer start deadline is earlier than the transfer possible time, an error processing is to be carried out. Here, a simple conceivable error processing is to try to determine the planned transfer time again without considering the charge rate, with respect to every information for which the planned transfer time was determined prior to the current execution of this step S307. More specifically, the processing content of the step S307 is modified to set the transfer start deadline determined by the above step S306 directly as the planned transfer time, and this modified step S307 is re-executed repeatedly. A more complicated error processing is to repeat the same processing as the above simple error processing while sequentially adding the information to be a target of this error processing one by one, starting from the target information of the immediately previous execution of this step S307, until it becomes possible to transfer the target information of the current execution of this step S307.

Note that, in order to reduce the possibility for this error processing to become necessary, it may be possible to determine the planned transfer time similarly as described above, with an agreement that the information can be transferred at the time zone which is not necessarily of the lowest charge rate available, as long as the charge rate is found to be lower than a certain threshold by the search backward in time starting from the transfer start deadline. In this case, it should be made possible for the user to enter the desired threshold by using the knowledge input unit 18. This threshold will be stored as a part of the information transfer evaluation criteria 25.

In this manner, the processing according to the flow chart of FIG. 10 can be realized.

Next, an exemplary procedure for setting up the information transfer plan according to a different strategy will be described. This procedure is what is to be called up under the circumstances which is different from the usual one described above. Considering a case of using the network for which the charge rate is higher for longer distances and varying according to the time zone (i.e., the night time and holiday discounts are provided), there is also a need to provide a function for setting up the information transfer plan by taking these factors into consideration. Such a function can be utilized effectively in a case of using the terminal 10 at a place remote from the information server 40 over a long period of time, as in a case of the business trip by the user.

In order to be able to deal with such a circumstances effectively, it is preferable to modify the system configuration of FIG. 1 described above into a modified system configuration as shown in FIG. 13. In this modified system configuration of FIG. 13, the system configuration of FIG. 1 is supplemented by an addition of a second information server 60 connected to the network 30. Here, the internal configurations of the terminal 10, the first information server 40 and the network service server 50 are substantially the same as those of FIG. 1 so that they are not depicted in FIG. 13.

The second information server 60 includes an environment acquisition unit 61, a positioning scheme control unit 63, an information positioning unit 64, a (third) information storage unit 65, a communication unit 66, and an information transfer plan table 67.

The environment acquisition unit 61 of the second information server 60 basically has the similar functions as the environment acquisition unit 11 of the terminal 10, except that the location of the second information server 60 is normally fixed so that the environment acquisition unit 61 has its own location information as prescribed semi-fixed data within itself and there is no need to make the inquiry to the network service server 50.

The positioning scheme control unit 63 of the second information server 60 controls the information positioning units 14 and 64 cooperatively with the positioning scheme control unit 13 of the terminal 10 according to the information transfer plan set up by the positioning scheme control unit 13 of the terminal 10, such that the user's information is positioned at each timing in appropriate one of the information storage unit 15 of the terminal 10, the information storage unit 45 of the first information server 40, and the information storage unit 65 of the second information server 60.

Note that it is also possible to include the second information server 60 within the network service server 50 if desired.

In the exemplary case described below, the procedure identical to that of the steps S101 to S108 described above is carried out first. Then, at the step S109, instead of the steps S301 to S307 described above, the steps S401 to S402 and S501 to S502 as described below are to be carried out. In a case of carrying out the steps S301 to S307 in the modified system configuration of FIG. 13, the procedure is substantially the same as that described above for the configuration of FIG. 1 so that it will not be repeated here.

Now, suppose that the conditions on the network environment in these circumstances are as follows. Namely, for the normal time zone (which is assumed to be the day time), the charge rate for a communication between the first information server 40 and the terminal 10 is N1, the charge rate for a communication between the first information server 40 and the second information server 60 is N2, and the charge rate for a communication between the second information server 60 and the terminal 10 is N3. On the other hand, for the discount time zone (which is assumed to be the night time), the charge rate for a communication between the first information server 40 and the terminal 10 is R1, the charge rate for a communication between the first information server 40 and the second information server 60 is R2, and the charge rate for a communication between the second information server 60 and the terminal 10 is R3. Here, assume that these charge rates are set up to satisfy at least the following relationship:

N1>R2+N3

Also, in order to simplify the explanation, suppose that the user uses the terminal 10 only in the normal time zone (the day time), and not in the discount time zone (the night time).

In the following, the outline of the information transfer plan in this case will be described. Note that in this example, the information transfer plan table 24 in the terminal 10 corresponds to the second information transfer plan table to be described below, while the information transfer plan table 67 in the second information server 60 corresponds to the second information transfer plan table and the third information transfer plan table to be described below.

First, during the discount time zone (the night time) in advance, the information which is predicted to become necessary tomorrow is directly transferred from the information storage unit 45 of the first information server 40 to the information storage unit 15 of the terminal 10 in a time sequence order, while that information which cannot be stored in the information storage unit 15 of the terminal 10 is transferred to the third information storage unit 65 of the second information server 60. Then, during the normal time zone (the day time), the information transfer plan is set up by the procedure similar to that of FIG. 10, and the information transfer between the information storage unit 15 of the terminal 10 and the information storage unit 65 of the second information server 60 is carried out according to this information transfer plan. The information that has been updated on the terminal 10 is stored in the information storage unit 65 of the second information server 60 once, and then written back into the information storage unit 45 of the first information server 40 later on when it becomes the discount time zone.

Figures 14, 15:
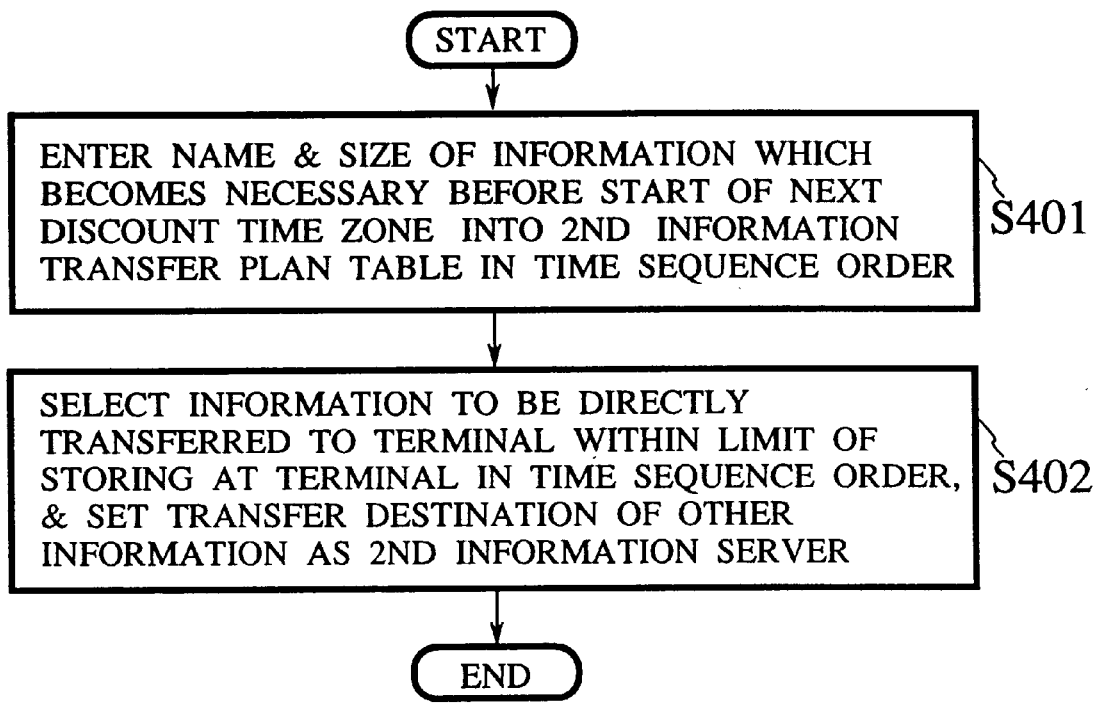
FIG. 14 is a flow chart for the processing during a discount time zone in the information processing system of FIG. 13.
FIG. 15 is a diagrammatic illustration of a second information transfer plan table used in the information processing system of FIG. 13.

FIG. 14 shows an exemplary procedure to be executed during the discount time zone. Here, it is assumed that a mode called business trip mode is defined to indicate the occurrence of the above described circumstance. This mode is stored as a part of the information transfer evaluation criteria 25. It is also possible for the utilization status prediction unit 12 to judge whether the above described circumstance has occurred or not by some method, and set up the business trip mode automatically. For instance, it is possible to consider a method for recognizing a case of the business trip when the terminal is located at a location which requires more than several hours of travelling from the usual activity area of a user, or according to the user's activity schedule description. In this example, however, this mode is to be set up by the user using the knowledge input unit 18 in order to simplify the explanation.

When it is in this mode at that time, it is apparent from the network environment of the utilization status prediction 20 that an ample period of time from that time is contained in the discount time zone, and the activity/work for this ample period of time from that time is open, the procedure of FIG. 14 is to be executed. Here, the ample period of time implies a period of time by which the necessary information transfer can be completed by means of the capability (bandwidth, quality, etc.) of the network available at that time. At this stage, an amount of information to be transferred is unknown, so that an empirical value for an amount of information utilized by a user in a single day can be used, for instance. (Typically, after the work of the day by the user at the business trip site is finished, when the onset of the discount time zone is detected at the step S103 of FIG. 2, this procedure is activated as a part of the step S109 of FIG. 2.) Otherwise, the procedure of FIG. 10 described above is to be executed.

(Step S401)

The positioning scheme control unit 13 of the terminal 10 refers to the utilization status prediction 20 of FIG. 7, to list up the name and size of each information which becomes necessary during a period before the start of the next discount time zone, which includes the next normal time zone, in a time sequence order, and enter them into the corresponding items in the second information transfer plan table shown in FIG. 15 which is provided within the information transfer plan table 24 of FIG. 1.

(Step S402)

The positioning scheme control unit 13 of the terminal 10 accumulates the sizes of the information in a time sequence order, and selects that information which is within a limit of storing capacity at the information storage unit 15 of the terminal 10 as candidates for the information to be directly transferred from the second information storage unit 45 of the first information server 40 to the first information storage unit 15 of the terminal 10. Actually, there is a possibility for each candidate to be already present in the first information storage unit 15 of the terminal 10 or the third information storage unit 65 of the second information server 60. Then, the terminal 10 is entered into the second information transfer plan table of FIG. 15 as the transfer destination for these selected information. As for the transfer route, the network provided at the charge rate of R1 is specified for use. The remaining information is information to be transferred from the first information server 40 to the terminal 10 indirectly, via the second information server 60, so that the second information server 60 is entered into the second information transfer plan table of FIG. 15 as the transfer destination for these remaining information. As for the transfer route, the network provided at the charge rate of R2 is specified for use.

The positioning scheme control unit 13 of the terminal 10 then transfers the completed second information transfer plan table of FIG. 15 to the positioning scheme control unit 63 of the second information server 60, and this second information transfer plan table of FIG. 15 is stored as the information transfer plan table 67 at the second information server 60.

In this manner, the processing according to the flow chart of FIG. 14 can be realized.

When the business trip mode is finished, the updated information are stored in the third information storage unit 65 of the second information server 60, and there is a need to write them back into the second information storage unit 45 of the first information server 40. An exemplary procedure for this purpose will now be described with reference to the flow chart of FIG. 16.

(Step S501)

The positioning scheme control unit 13 of the terminal 10 refers to the utilization status prediction 20, and notifies name of each information which becomes necessary before the start of the next discount time zone to the positioning scheme control unit 63 of the second information server 60.

(Step S502)

Figures 16, 17:
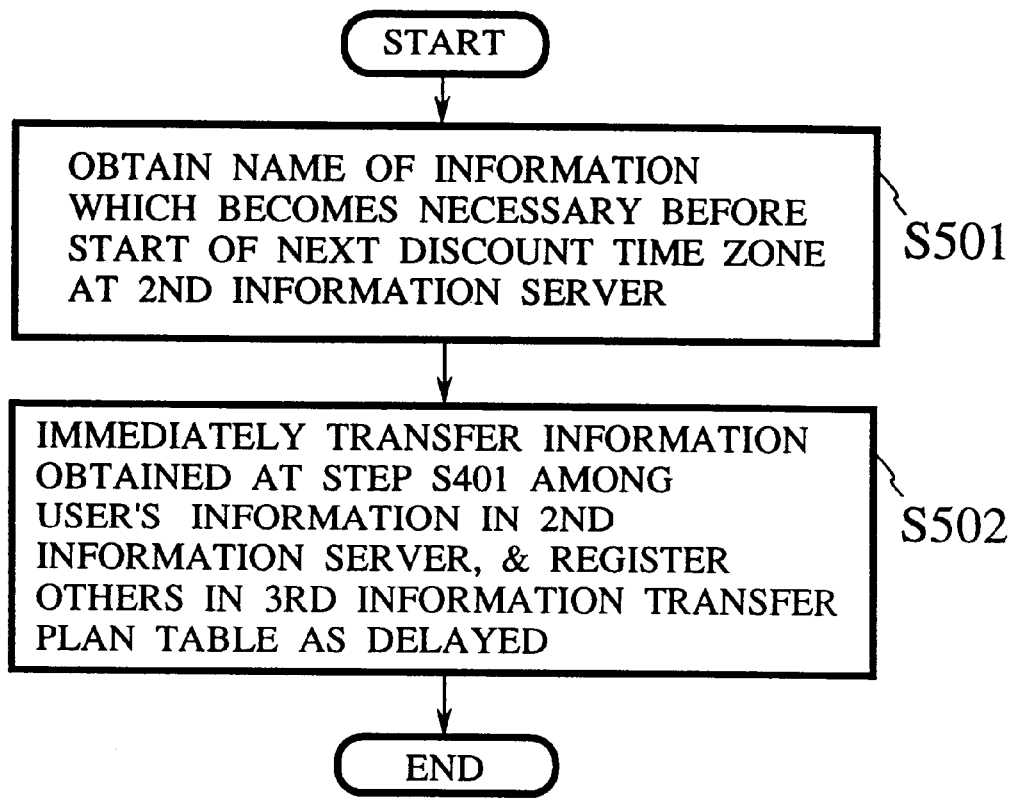
FIG. 16 is a flow chart for the processing carried out by a second information server in the information processing system of FIG. 13.
FIG. 17 is a diagrammatic illustration of a third information transfer plan table used in the information processing system of FIG. 13.

The positioning scheme control unit 63 of the second information server 60 compares the notified information name with the names of the user's information stored in the information storage unit 65 of the second information server 60 at that point, and enters the coinciding information names as targets for immediate transfer, into the third information transfer plan table shown in FIG. 17 which is provided within the information transfer plan table 67 of FIG. 13, so that this information is transferred to the first information server 40. As for the transfer route, the network provided at the charge rate of N2 is specified for use. Also, the names of the rest of the user's information stored in the information storage unit 65 is entered into the third information transfer plan table of FIG. 17 as targets for delayed transfer, so that this information will be transferred to the first information server 40 after some delay. As for the transfer route, the network provided at the charge rate of R2 is specified for use.

In this manner, the processing according to the flow chart of FIG. 16 can be realized.

This completes the description of the step S109 in the system configuration of FIG. 1 or the modified system configuration of FIG. 13.

[Step S110]

In a case of the system configuration of FIG. 1, after the information transfer plan is set up as described above, the positioning scheme control unit 13 of the terminal 10 checks whether the information transfer at that point is necessary or not. In a case the time at that point is the planned transfer time in the first information transfer plan table 24 (FIG. 12, where a value "NOW" is registered as the planned transfer time), it is judged that the information transfer at that point is necessary. When the information transfer at that point is necessary, the operation proceeds to the step S111, whereas when the information transfer at that point is unnecessary, the operation returns to the step S103.

In a case of the modified system configuration of FIG. 13, after the information transfer plan is set up as described above, the positioning scheme control unit 13 of the terminal 10 and the positioning scheme control unit 63 of the second information server 60 check whether the information transfer at that point is necessary or not.

Then, in any one of a case in which the time at that point is planned transfer time in the first information transfer plan table 24 (FIG. 12, where a value "NOW" is registered as the planned transfer time), a case in which the non-empty second information transfer plan table (FIG. 15) exists in the information transfer plan table 24 or 67, a case in which the target for the immediate transfer is still remaining in the third information transfer plan table (FIG. 17) in the information transfer plan table 67, and a case in which the target for the delayed transfer is still remaining in the third information transfer plan table (FIG. 17) and the time at that point is in the discount time zone for the charge rate of the network for a communication between the first information server 40 and the second information server 60, it is judged that there is a need for the information transfer at that point. In particular, in order to judge whether the last one is actually the case or not, the positioning scheme control unit 63 of the second information server 60 obtains the network environment from the network environment information providing unit 52 of the network service server 50 via the environment acquisition unit 61.

When the information transfer is necessary at that point, the operation proceeds to the step S111, whereas when the information transfer is not necessary at that point, the operation returns to the step S103.

[Step S111]

In a case of the system configuration of FIG. 1, the positioning scheme control unit 13 of the terminal 10 activates the information positioning units 14 and 44 to carry out the information transfer, by specifying the information to be transferred, from where to where it should be transferred, and which network should be used for the transfer (the transfer route).

In a case of carrying out the control of the transfer according to the first information transfer plan table of FIG. 12, the information for which the planned transfer time is the present time is set to be the information to be transferred to the information storage unit 15 of the terminal 10 by using the network specified by the transfer route.

In a case where there is not enough space in the information storage unit 15, the information which is not necessary at that point (a value in the item of the necessity in the first information transfer plan table 24 is set to be "NULL") and which has been updated is set as the information to be transferred from the information storage unit 15 of the terminal 10 to the information storage unit 45 of the first information server 40 by means of the above noted network, In a case of the modified system configuration of FIG. 13, the positioning scheme control unit 13 of the terminal 10 and the positioning scheme control unit 63 of the second information server 60 activates the information positioning units 14, 44, and 64 by specifying the information to be transferred, the source and the destination of the transfer, and the network to be used for the transfer (transfer route), so as to carry out the information transfer.

In a case of controlling the transfer according to the first information transfer plan table of FIG. 12, the information whose planned transfer time is the present time is set as the information to be transferred to the information storage unit 15 of the terminal 10 by the network specified by the transfer route.

In a case where the information storage unit 15 does not have a sufficient space, the information which is not necessary at that point (the information for which the value in the item for the necessity in the first information transfer plan table is "NULL") and which has been updated is set as the information to be transferred from the information storage unit 15 of the terminal 10 to the information storage unit 45 or 65 of the first or second information server 40 or 60 by the specified network.

In a case of controlling the transfer according to the second information transfer plan table of FIG. 15, the information to be transferred, the transfer destination, and the transfer route are supposed to be already specified, and the transfer source is set as the first information server 40.

In a case of controlling the transfer of the immediate transfer target in the third information transfer plan table of FIG. 17, the information that has been updated among the immediate transfer targets is selected as the information to be transferred, and the information transfer from the information storage unit 65 of the second information server 60 to the information storage unit 45 of the first information server 40 by the network specified by the transfer route is carried out.

In a case of controlling the transfer of the delayed transfer target in the third information transfer plan table of FIG. 17, the information that has been updated among the delayed transfer targets is selected as the information to be transferred, and the information transfer from the information storage unit 65 of the second information server 60 to the information storage unit 45 of the first information server 40 by the network specified by the transfer route is carried out.

[Step S112]

A processing necessary to finish the regular processing for a particular user according to the flow chart of FIG. 2 is carried out. For example, in a case where the information to which the change has been made is stored in the information storage unit 15 of the terminal 10, the processing to write this information back to the information storage unit 45 of the information server 40 is carried out. Here, it is also possible to carry out the processing which accounts for the cost of the network, etc., similarly as in the above described procedure. This can be easily realized by the straightforward application of the above described procedure, so that the detail of this case will not be described here.

In this manner, the regular processing according to the flow chart of FIG. 2 can be realized.

Next, the processing for addition and correction of the utilization prediction knowledge 17 to be carried out separately from the above described regular processing will be described in detail.

This processing includes what is to be automatically carried out by the knowledge correction/acquisition unit 16, and what is to be carried out explicitly by the user using the knowledge input unit 18. In this first embodiment, a part of the former is incorporated into a part (step S107) of the regular processing of FIG. 2 so that this part can be carried out regularly. By incorporating this processing entirely into the regular processing, it would be possible to constantly update the utilization prediction knowledge, but in view of the processing load, only those for which the processing load is light can be carried out within the regular processing, and those for which the processing load is heavy can be carried out as the non-regular processing (which is to be executed in the night time at which the terminal 10 is presumably not used, for example).

The basic strategy by which the knowledge correction/acquisition unit 16 corrects the utilization prediction knowledge 17 is as follows. Namely, the knowledge correction/acquisition unit 16 scans through the terminal utilization status/environment information records 21 in which the changes in the terminal utilization status/environment are recorded (by the step S106 described above), and check if each change was a predicated one or not. When it is the predicted change, the certainty of the knowledge used in making that prediction is raised, whereas when it is not the predicted one, the knowledge is corrected in order to make the better prediction possible in future.

Figure 18:
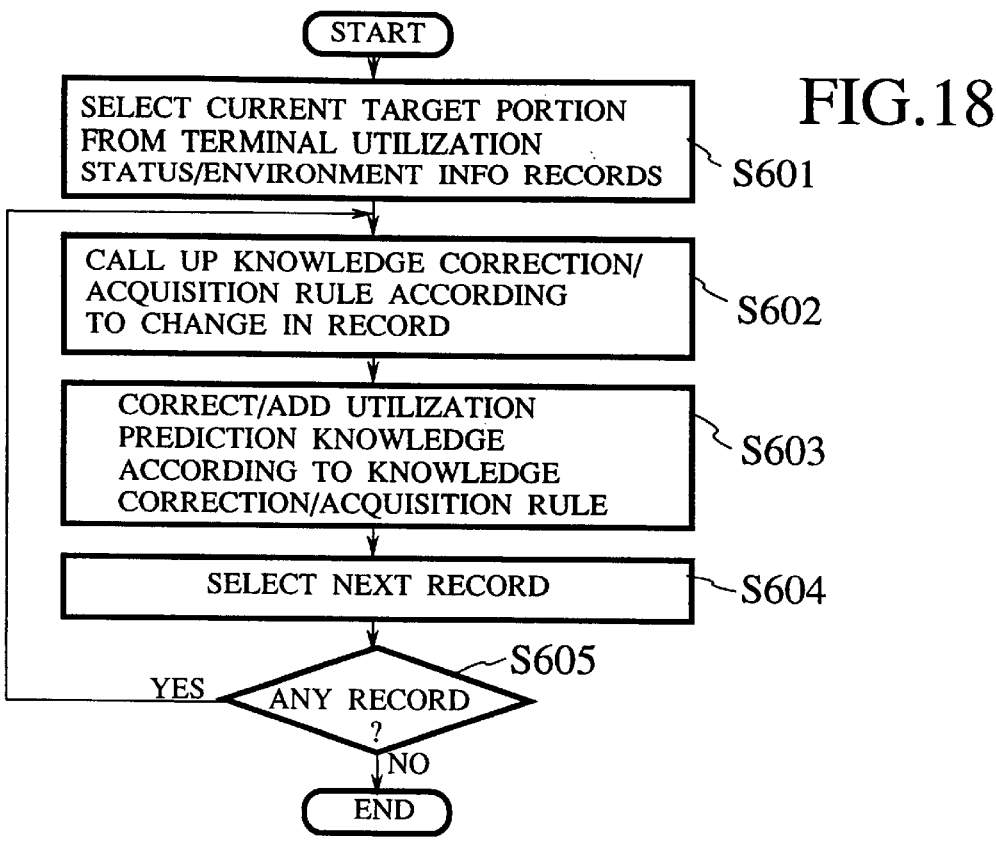
FIG. 18 is a flow chart for the processing carried out by a knowledge correction/acquisition unit in the information processing system of FIG. 1

FIG. 18 shows an exemplary procedure for the knowledge correction/acquisition unit 16 to correct the utilization prediction knowledge 17. Here, the correction of the knowledge implies the correction of knowledge (such as parameters) already used in past the utilization prediction, while the acquisition of the knowledge implies the addition of a fact that has not been used in the past utilization prediction as a part of the knowledge to be used for the future utilization prediction by some method (such as by the use of the meta-knowledge, for example).

(Step S601)

In the terminal utilization status/environment information records 21, a portion to be a current correction target (which is to cause the call up of a rule for correction) is determined. The first record that has been added after the previous correction in the terminal utilization status/environment information records 21 that are arranged in a time sequence order is set to be a top current correction target.

(Step S602)

According to the content of change in the terminal utilization status/environment information, a knowledge correction/acquisition rule is called up. As an exemplary manner for realizing this, a trigger table (similar to the table of FIG. 4 used at the step S107 described above) registering a list of knowledge correction/acquisition rules to be called up for different items can be provided, and a mechanism for call up the knowledge correction/acquisition rule related to the changed item can be provided.

(Step S603)

According to the called up knowledge correction/acquisition rule, the utilization prediction knowledge 17 is corrected.

In the following, some examples of the knowledge correction/acquisition rules to be used here will be described one by one.

Knowledge Correction/Acquisition Rule (C-1)

Outline: The habit knowledge (H-1) is corrected.

Triggering condition: A finishing of the processing by the newspaper viewer (which is recorded in the item of application in the terminal utilization status/environment information record 21).

Processing content:

(1) Subscribed newspaper

Update statistical data concerning the user's subscribed newspaper in (H-1) according to a type of the subscribed newspaper accessed by the newspaper viewer.

(2) Content of activity/work which is simultaneously in progress

Update statistical data concerning the activity/work at a time of reading the newspaper in (H-1) according to a content of the activity/work while the newspaper viewer was executed.

(3) Work time

Update statistical data concerning a standard amount of work for reading the newspaper in (H-1) according to a period of time for which the newspaper viewer was executed.

Knowledge Correction/Acquisition Rule (C-2)

Outline: A knowledge concerning a correlation between the time/time zone and the work content is acquired or generated.

Triggering condition: Start or end of application, or open or close of data.

Processing content: Estimate the work from the items of application and data in the terminal utilization status/environment information record 21, by checking whether the processing target data of the application is contained in a directory for a certain work, whether the data is of a particular type, whether the application is capable of editing the data, etc. for example. Add a record of the relationship between the work estimated in this manner and the time/time zone to the statistical data for the work and the time/time zone, and calculate a correlation by including the past statistical data. When a correlation exceeds a certain value, additionally register the utilization prediction knowledge indicating that the possibility for carrying out that work at that time/time zone is large, medium, or small (which is assigned according to a value of the correlation). In other words, produce the utilization prediction knowledge, and add its triggering condition to the prediction knowledge trigger table of FIG. 9. In addition, produce the correction rule related to that utilization prediction knowledge, and add its triggering condition to the knowledge correction/acquisition rule trigger table of FIG. 4.

Knowledge Correction/Acquisition Rule (C-3)

Outline: A knowledge concerning a correlation between the application and the data is acquired or generated.

Triggering condition: Open of data.

Processing content: Add a record of the relationship between the data and the application which opens the data to the statistical data for the application and the data used by that application, and calculate a correlation by including the past statistical data. When a correlation exceeds a certain value, additionally register the utilization prediction knowledge indicating that the possibility for using that application at a time of using that data is large, medium, or small (which is assigned according to a value of the correlation). In other words, produce the utilization prediction knowledge, and add its triggering condition to the prediction knowledge trigger table of FIG. 9. In addition, produce the correction rule related to that utilization prediction knowledge, and add its triggering condition to the knowledge correction/acquisition rule trigger table of FIG. 4.

Knowledge Correction/Acquisition Rule (C-4)

Outline: A knowledge concerning a correlation between the application and the place is acquired or generated.

Triggering condition: Start or end of application, and a change of place.

Processing content: Add a record of the relationship between the execution of the application and the place of the execution to the statistical data for the application used at the place, and calculate a correlation by including the past statistical data. When a correlation exceeds a certain value, additionally register the utilization prediction knowledge indicating that the possibility for using that application at that place is large, medium, or small (which is assigned according to a value of the correlation). In other words, produce the utilization prediction knowledge, and add its triggering condition to the prediction knowledge trigger table of FIG. 9. In addition, produce the correction rule related to that utilization prediction knowledge, and add its triggering condition to the knowledge correction/acquisition rule trigger table of FIG. 4.

Apart from these rules explicitly described in the above, it is also possible to use various other rules which utilize the correlations among various facts and events.

(Step S604)

The next record is selected in a time sequence order from the terminal utilization status/environment information records 21.

(Step S605)

When the next record is selected at the step S604, the processing returns to the step S603, whereas when there is no record to select at the step S604, the processing is terminated.

Figure 19:
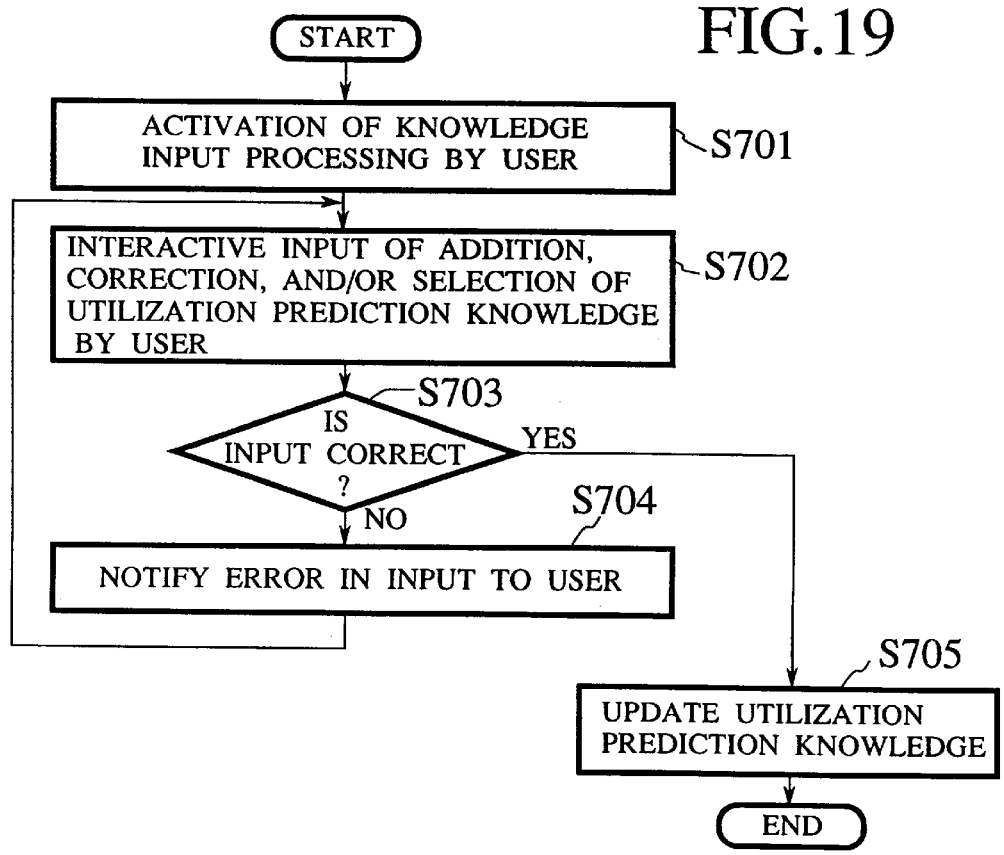
FIG. 19 is a flow chart for the processing using a knowledge input unit in the information processing system of FIG. 1.

Next, FIG. 19 shows an exemplary procedure for the user to use the knowledge input unit 18 in order to add, correct, and/or select the utilization prediction knowledge 17.

(Step S701)

The knowledge input unit 18 (which is implemented as an application for knowledge input, for example) is activated by the user.

(Step S702)

By means of the interactive user interface, a request for addition, correction, and/or selection of the utilization prediction knowledge 17 from the user is received.

(Step S703)

A correctness of the user's input is verified, and when the user's input is correct, the processing proceeds to the step S705, whereas when the user's input is not correct, the processing proceeds to the step S704.

(Step S704)

Appropriate notice regarding an error in the user's input (such as a reason why it is an error, a direction for error correction, etc.) is given to the user, and the processing returns to the step S703.

(Step S705)

According to the user's input, the utilization prediction knowledge 17 is added, corrected, and/or selected.

For example, consider a case of the registration of the schedule information by the user. In a case where two or more schedules overlap at the same time zone, the double booking is detected at the step S703. In such a case, at the step S704, either one of the overlapping schedule is to be deleted, or the notice for urging the user to add the priority levels to the schedules is issued. The priority level of the schedule can be reflected in the utilization prediction as a value (large or small) of the possibility for carrying out the activity related to that schedule.

It should be apparent that the evaluation criteria for expressing a point of view of the utility and convenience of the user (such as the information transfer evaluation criteria) mentioned above can also be added, corrected, and/or selected by the procedure similar to that of FIG. 19.

As described above, according to this first embodiment, it is possible to reduce the probability for the information (data or program) required by the user to be not stored in the information storage unit of the terminal by the time the user actually requires that information, by predicting which information will be necessary by what time according to the relationship between the user's activity schedule or the user's activity and the information, and controlling the transfer of the information such that the predicted information is pre-read into the information storage unit for storing the information transferred via the network before the predicted time.

Note that it is possible to pre-read the information set which is not necessarily within a range of a single locality for the information accesses, so that by expanding the memory capacity of the information storage unit more than a capacity required by the information set for a single locality, it is possible to reduce a number of information transfers.

In addition, it is possible to improve the utility and convenience of the user by increasing the possibility for being able to carry out more preferable information transfers in view of the evaluation criteria, by determining which information transfer should be carried out by using which network when according to the evaluation criteria from the user's point of view (such as an increase of the fee for use of the network due to the use of the network environment provided at a high charge rate should be avoided, a probability for the user to be able to obtain the necessary information at the necessary time should be increased even if it requires the use of the network environment provided at a high charge rate, etc.) in order to store the predicted information in the information storage unit of the terminal by the predicted time according to the relationship between the user's activity schedule and the network environment available at each time and the prediction concerning the information, and controlling the information transfer according to the determined information transfer plan.

Note also that it is possible to pre-read the information set which is not necessarily within a range of a single locality for the information accesses, so that it is possible to reduce the possibility for being required to carry out the information transfer in less preferable network environment in view of the evaluation criteria.

In addition, it is possible to increase the possibility for carrying out more preferable information transfer control in view of the evaluation criteria, by detecting the network environment, determining which information transfer should be carried out in which network environment when by accounting for the actual detected network environment, and controlling the information transfer according to the determined information transfer plan.

Figure 21:
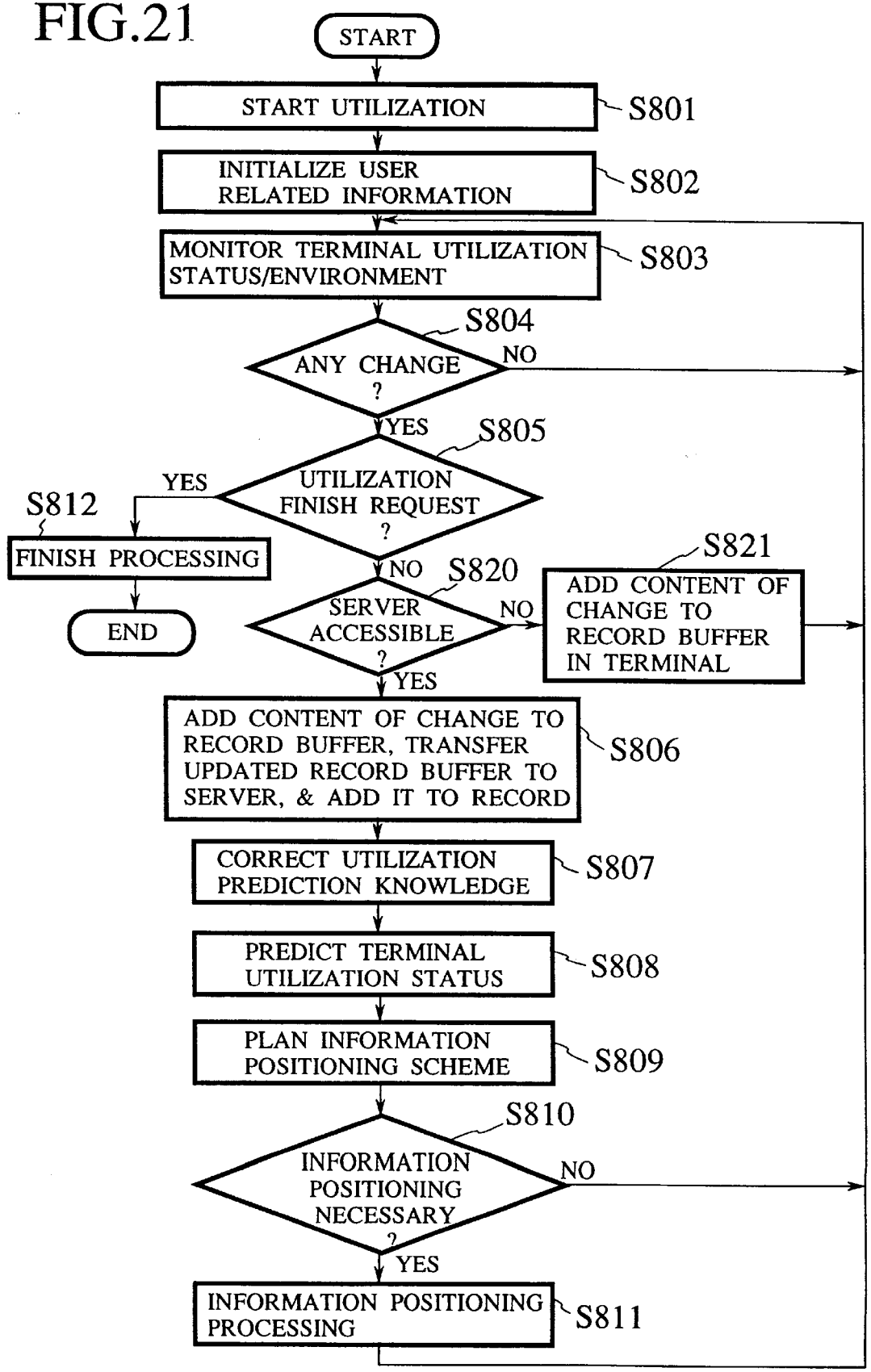
FIG. 21 is a flow chart for the regular processing carried out by the information processing system of FIG. 21.
Figure 22:
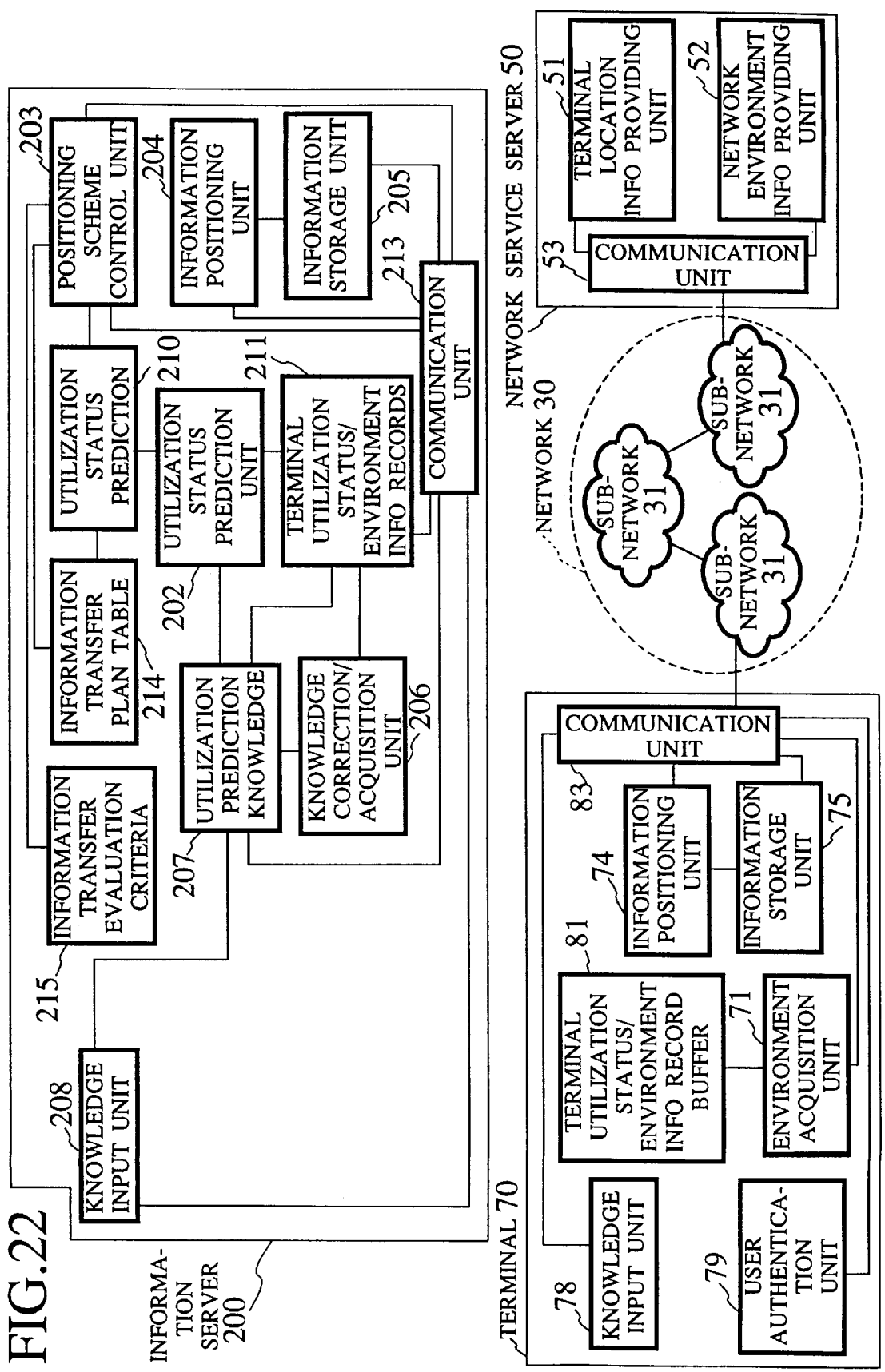
FIG. 22 is a block diagram of a modified system configuration for the information processing system of FIG. 20.

Referring now to FIG. 20 to FIG. 22, the second embodiment of the information processing system according to the present invention will be described in detail.

The mobile terminal is often limited not only in its memory capacity but also in its processing power. In such a case, it is effective to reduce the processing load of the mobile terminal by realizing the information processing system of the present invention distributedly and cooperatively among the terminal and a computer outside of the terminal (such as the network service server or the information server). This second embodiment is directed to such a modified realization of the information processing system of the present invention.

In this second embodiment, the information processing system has an exemplary overall configuration as shown in FIG. 20, which generally comprises a terminal 70, an information server 90, and a network service server 100, which are mutually connected through a network 30.

The terminal 70 includes an environment acquisition unit 71, an information positioning unit 74, a (first) information storage unit 75, a knowledge input unit 78, a user authentication unit 79, a terminal utilization status/environment information record buffer 81, and a communication unit 83. Of these, the environment acquisition unit 71, the information positioning unit 74, the information storage unit 75, the knowledge input unit 78, the user authentication unit 79, and the communication unit 83 are basically equivalent to the corresponding elements of the terminal 10 in the first embodiment of FIG. 1. The terminal utilization status/environment information record buffer 81 temporarily stores the terminal utilization status/environment information record obtained by the environment acquisition unit 71.

The information server 90 includes a communication unit 93, an information positioning unit 94, and a (second) information storage unit 95, which are basically equivalent to the corresponding elements of the information server 40 in the first embodiment of FIG. 1.

The network service server 100 includes a utilization status prediction unit 102, a positioning scheme control unit 103, an information positioning unit 104, an information storage unit 105, a knowledge correction/acquisition unit 106, a utilization prediction knowledge 107, a knowledge input unit 108, a utilization status prediction 110, terminal utilization status/environment information records 111, a communication unit 113, an information transfer plan table 114, information transfer evaluation criteria 115, a terminal location information providing unit 121, and a network environment information providing unit 122. Of these, the communication unit 113, the terminal location information providing unit 121, and the network environment information providing unit 122 are basically equivalent to the corresponding elements of the network service server 50 in the first embodiment of FIG. 1.

On the other hand, the utilization status prediction unit 102, the positioning scheme control unit 103, the information positioning unit 104, the information storage unit 105, the knowledge correction/acquisition unit 106, the utilization prediction knowledge 107, the knowledge input unit 108, the utilization status prediction 110, the terminal utilization status/environment information records 111, the information transfer plan table 114, and the information transfer evaluation criteria 115 are basically equivalent to the corresponding elements of the terminal 10 in the first embodiment of FIG. 1, except that these elements are now provided in the network service server 100 rather than in the terminal 70.

Similarly as in the first embodiment described above, the network 30 may be constructed by a single network, but in general, this network 30 is constructed by interconnection of sub-networks 31 such as radio or wired public networks, local networks, etc. as shown in FIG. 20.

Also, similarly as in the first embodiment described above, the terminal 70 is a mobile terminal such as a portable terminal, for which the sub-network 31 to be used for a connection between the terminal 70 and the information server 90 changes depending on time and place. In addition, depending on an activity of the user, there may be a relatively long period of time during which the terminal 70 is not connected to the network 30.

A work on the terminal 70 by the user is carried out as the application executed on the terminal 70 makes accesses, additions, and/or changes to the information. The executable program given in a form of the application and the data may contain those which are permanently stored in the information storage unit 75, as well as those which are normally stored in an external device having an information storage function, such as the information storage unit 95 in the information server 90 for example, and which are stored into the information storage unit 75 in the terminal 70 as a result of the transfer of data and programs realized by activating the information positioning units 74 and 94 at appropriate timings. However, because of the requirements for a mobile size and a reasonable cost of the terminal 70, a capacity of the information storage unit 75 of the terminal 70 is usually limited. Consequently, the latter scheme will be used for most of the data and the programs.

As described above for the first embodiment, the network environment in which the terminal 70 is connected to the network 30 can be changed depending on time and place, so that if the information transfer is carried out at a timing where the user requests the information (data or program)

necessary for the work, there can be cases in which the information transfer time becomes long (such as a case of the narrow bandwidth and a case of the low quality) or cases in which the information transfer fee becomes high (such as a case of the terminal 70 far distanced from the information server 90 when the charge rate accounts for distance and a case of using a sub-network 31 with a high charge rate), and therefore the utility and convenience of the user can be damaged severely. For this reason, in order to avoid such circumstances, it is effective to predict the information which will be required by the user in future, and transfer the predicted information to the information storage unit 75 in the terminal 70 at a timing where the network environment is suitable for the information transfer from a point of view of the utility and convenience of the user.

Now, the regular processing of this information processing system of FIG. 20 is carried out according to the flow chart of FIG. 21. This FIG. 21 realizes the similar procedure as that of the first embodiment shown in FIG. 2 described above, and includes necessary modifications on the flow chart of FIG. 2 in order to realize the similar procedure distributedly among the terminal 70 and the network service server 100. Here, the correspondence of the steps in FIG. 2 and FIG. 21 should be quite obvious, so that the regular processing according to the flow chart of FIG. 21 will be described below with emphases on the difference with respect to the flow chart of FIG. 2.

[Step S801]

The utilization of the terminal 70 by the user is started by the user authentication such as that using a combination of a user name and a password which is done by the user authentication unit 79. This user authentication also serves for the purpose of preventing the erroneous leak of the information to persons other than the legitimate user. For example, in a case of carrying out the information transfer between the first information storage unit 75 and the second information storage unit 95, this user authentication imposes a limitation to carry out the information transfer within a range of the access rights assigned to the authenticated user.

[Step S802]

In response to a request from the user authentication unit 79, according to the user name authenticated at the step S801, the user related informations for the authenticated user are initialized by the network service server 100. For example, when the utilization prediction knowledge relevant for the authenticated user is present only in the second information storage unit 95 and not in the network service server 100, the information positioning unit 104 is controlled to transfer this utilization prediction knowledge to the network service server 100, and set it as the utilization prediction knowledge 107 to be used in the subsequent prediction. Note here that, although not shown in FIG. 21, there can be various possible processings that can be carried out in a case where the access from the terminal 70 to the network service server 100 is not possible. As an exemplary processing in such a case, it is possible for the user authentication unit 79 to urge the user to make the network connection, and carry out the processing of this step S802 at a time the connection is made.

[Step S803]

The processing similar to the step S103 of FIG. 2 is carried out. Namely, in order to monitor the terminal utilization status/environment, the terminal utilization status/environment information is acquired by the environment acquisition unit 71 from the terminal location information providing unit 121 and the network environment information providing unit 122. Here, the terminal utilization status/ environment information include date and time, a current location of the terminal 10, an application activated on the terminal 10, data accessed by the application, and an environment (network environment) of a network to which the terminal 10 is currently connected or capable of being connected.

[Step S804]

The processing similar to the step S104 of FIG. 2 is carried out. Namely, the environment acquisition unit 71 compares each item in the terminal utilization status/ environment information acquired by the current execution of the step S803 with each item in the latest content of the terminal utilization status/environment information record buffer 81, and if there is any change, the processing proceeds to the next step S805, whereas if there is no change, the processing returns to the step S803 after the delay of a prescribed period of time.

Here, it is to be noted that the change to be detected in the date and time item is to be limited only to what is registered in advance. Note also that, in a case of executing this step S804 for the first time, there is no previous terminal utilization status/environment information record to compare with so that all the items are to be regarded as changed.

[Step S805]

The processing similar to the step S105 of FIG. 2 is carried out. Namely, when the change detected at the step S804 indicates the terminal utilization finish request from the user, the regular processing according to the flow chart of FIG. 21 is terminated. Otherwise, the processing proceeds to the next step S820.

[Step S820]

In a case where the change detected at the step S804 is other than the terminal utilization finish request from the user, the processing proceeds to the step S806 when an access from the terminal 70 to the network service server 100 via the network is possible, and the processing proceeds to the step S821 otherwise.

[Step S821]

When the change detected at the step S804 is other than the terminal utilization finish request from the user, and an access from the terminal 70 to the network service server 100 via the network is not possible, it is impossible to record the content of change in the terminal utilization status/ environment information detected at the step S805 into the terminal utilization status/environment information records 111 of the network service server 100 at this point. For this reason, the detected content of change is added to the terminal utilization status/environment information record buffer 81 along with the unchanged items (to each of which an explicitly note "NO CHANGE" is added to its content). Then, the processing returns to the step S803.

[Step S806]

When the change detected at the step S804 is other than the terminal utilization finish request from the user, and an access from the terminal 70 to the network service server 100 via the network is possible, the content of change in the terminal utilization status/environment information detected at the step S805 is added to the terminal utilization status/ environment information record buffer 81 along with the unchanged items (to each of which an explicitly note "NO CHANGE" is added to its content). Then, the terminal utilization status/environment information record buffer 81 that has been updated since the immediately previous execution of this step S806 is transferred to the network service server 100 and added to the terminal utilization status/ environment information records 111 of the network service server 100.

[Step S807]

The processing similar to the step S107 of FIG. 2 is carried out. Namely, according to the change in the terminal utilization status/environment information, the utilization prediction knowledge 107 is corrected or added by the knowledge correction/acquisition unit 106 of the network service server 100.

[Step S808]

The processing similar to the step S108 of FIG. 2 is carried out. Namely, the utilization status prediction unit 102 in the network service server 100 predicts the future terminal utilization status according to the terminal utilization status/environment information and the utilization prediction knowledge 107, and produces the utilization status prediction 110.

[Step S809]

The processing.similar to the step S109 of FIG. 2 is carried out. Namely, according to the produced utilization status prediction 110 and the information transfer evaluation criteria 115, the positioning scheme control unit 103 of the network service server 100 sets up an information transfer plan as to which data and/or application program should be transferred at what timing using which network, and updates the information transfer plan table 114.

[Step S810]

The processing similar to the step S110 of FIG. 2 is carried out. Namely, after the information transfer plan is set up as described above, the positioning scheme control unit 103 of the network service server 100 checks whether the information transfer at that point is necessary or not. In a case the time at that point is the planned transfer time in the information transfer plan table 114 (FIG. 12, where a value "NOW" is registered as the planned transfer time), it is judged that the information transfer at that point is necessary. When the information transfer at that point is necessary, the operation proceeds to the step S811, whereas when the information transfer at that point is unnecessary, the operation returns to the step S803.

[Step S811]

The processing similar to the step S111 of FIG. 2 is carried out, as the positioning scheme control unit 103 of the network service server 100 remotely activates and controls the information positioning unit 74 of the terminal 70 and the information positioning unit 94 of the information server 90. Namely, the positioning scheme control unit 103 activates the information positioning units 74 and 94 to carry out the information transfer, by specifying the information to be transferred, from where to where it should be transferred, and which network should be used for the transfer (the transfer route).

In a case of carrying out the control of the transfer according to the information transfer plan table shown in FIG. 12 which is provided within the information transfer plan table 114 of FIG. 20, the information for which the planned transfer time is the present time is set to be the information to be transferred to the information storage unit 75 of the terminal 70 by using the network specified by the transfer route.

In a case where there is not enough space in the information storage unit 75, the information which is not necessary at that point (a value in the item of the necessity in the information transfer plan table 114 is set to be "NULL") and which has been updated is set as the information to be transferred from the information storage unit 75 of the terminal 70 to the information storage unit 95 of the information server 90 by means of the above noted network,

[Step S812]

In order to finish the regular processing for a particular user according to the flow chart of FIG. 21, the processing similar to the step S112 of FIG. 2 is carried out. For example, in a case where the information to which the change has been made is stored in the information storage unit 75 of the terminal 70, the processing to write this information back to the information storage unit 95 of the information server 90 is carried out. Here, it is also possible to carry out the processing which accounts for the cost of the network, etc., similarly as in the above described procedure. This can be easily realized by the straightforward application of the above described procedure, so that the detail of this case will not be described here.

In this manner, the regular processing according to the flow chart of FIG. 21 can be realized.

The processing for addition and correction of the utilization prediction knowledge 107 which is to be carried out separately from the above described regular processing is substantially similar to that of the first embodiment described above.

The processing for addition and correction of the utilization prediction knowledge 107 by the knowledge correction/acquisition unit 106 can be carried out by the same procedure as that of FIG. 18.

In this second embodiment, the function corresponding to the knowledge input unit 18 of FIG. 1 in the first embodiment described above is further divided into the knowledge input unit 78 of the terminal 70 which functions as the user interface, and the knowledge input unit 108 of the network service server 100 which functions to verify the user's input and update the utilization prediction knowledge 107. In a case where an access from the terminal 70 to the network service server 100 via the network is possible, the addition and correction of the utilization prediction knowledge 107 by the user according to the same procedure as that of FIG. 19 can be carried out, but this processing by the user is not available when an access is impossible.

It should be apparent that the evaluation criteria for expressing a point of view of the utility and convenience of the user (such as the information transfer evaluation criteria) can also be added, corrected, and/or selected by the procedure similar to that of FIG. 19.

It is to be noted that, as the knowledge input unit 108 described above exemplifies, the function attributed to a single function block in FIG. 20 can be further divided for the purpose of the more distributed processing.

It is also to be noted that the system configuration of FIG. 20 is only an example of the function distribution, and any other desirable manner of function distribution can be used instead. For example, it is possible to modify the system configuration of FIG. 20 into a modified system configuration as shown in FIG. 22, which generally comprises the terminal 70 similar to that of FIG. 20, an information server 200, and the network service server 50 similar to that of FIG. 1, which are mutually connected through a network 30.

In this modified system configuration of FIG. 22, the information server 200 includes a utilization status prediction unit 202, a positioning scheme control unit 203, an information positioning unit 204, an information storage unit 205, a knowledge correction/acquisition unit 206, a utilization prediction knowledge 207, a knowledge input unit 208, a utilization status prediction 210, terminal utilization status/environment information records 211, a communication unit 213, an information transfer plan table 214, and information transfer evaluation criteria 215, which are basically equivalent to the corresponding elements of the terminal 10 in the first embodiment of FIG. 1 or the network service server 100 in the second embodiment of FIG. 20, except that these elements are now provided in the information server 200 rather than in the terminal 70 or the network service server 50. Thus, in this modified system configuration of FIG. 22, the information server 200 provides functions similarly to those of the network service server 100 of FIG. 20 except for those of the terminal location information providing unit 121 and the network environment information providing unit 122, in addition to the basic functions of the information server.

As described above, according to this second embodiment, it is possible to achieve the similar effects as the first embodiment described above, while also reducing the processing load of the mobile terminal.

Namely, it is possible to reduce the probability for the information (data or program) required by the user to be not stored in the information storage unit of the terminal by the time the user actually requires that information, by predicting which information will be necessary by what time according to the relationship between the user's activity schedule or the user's activity and the information, and controlling the transfer of the information such that the predicted information is pre-read into the information storage unit for storing the information transferred via the network before the predicted time.

Moreover, regarding the information transfer necessary in effectively reducing the probability for the information (data or program) required by the user to be not stored in the information storage unit of the terminal by the time the user actually requires that information, it becomes possible to carry out this information transfer at a time where the network suitable for the transfer is available, by detecting the current location of the terminal, predicting the future location of the terminal according to the user's activity schedule which is stored in advance, determining the transfer time and the network to be used for the predicted information according to the detected current location of the terminal, the predicted future location of the terminal, and the relationship between the terminal location and the available network which is stored in advance, and controlling the transfer of the information from the information server to the terminal according to the determined information transfer plan.

Note that it is also possible for this second embodiment to incorporate the second information server 60 of FIG. 13 as in the first embodiment described above. The configuration and the operation in such a case should be obvious from the above description of the first and second embodiment, so that this case will not be described in detail here.

Thus, according to the present invention, it is possible to reduce the probability for the information (data or program) required by the user to be not stored in the information storage unit of the terminal by the time the user actually requires that information, by predicting which information will be necessary by what time according to the knowledge on the user's activity schedule and the knowledge on the relationship between the user's activity and the attribute of the information, and controlling the transfer of the information such that the predicted information is pre-read into the information storage unit for storing the information transferred via the network before the predicted time.

Here, it is possible to pre-read the information set which is not necessarily within a range of a single locality for the information accesses, so that by expanding the memory capacity of the information storage unit more than a capacity required by the information set for a single locality, it is possible to reduce a number of information transfers.

Also, in a case where more than one network is available for the transfer, it becomes possible to control the terminal to carry out the information transfer by selecting the time and the network suitable for the transfer by avoiding the time in which the network suitable for the transfer is not available according to the user's activity, by determining the transfer time and the network to be used for the information transfer according to the knowledge on the user's activity schedule and the knowledge on the relationship between the user's activity and the available network, and controlling the transfer of the information according to the determined information transfer plan, so that the utility and convenience from the user's point of view can be improved.

Moreover, by determining the transfer time according to the relationship between the time for use of the network available for the information transfer and the information transfer cost, and controlling the transfer of the information according to the determined information transfer plan, it becomes possible to control the transfer to reflect the economical or time-related cost in a case of utilizing the network for which the charge rate or the quality are different at different times, so that the utility and convenience from the user's point of view can be improved.

In addition, it is possible to improve the utility and convenience of the user by increasing the possibility for being able to carry out more preferable information transfers in view of the evaluation criteria, by determining which information transfer should be carried out by using which network when according to the evaluation criteria from the user's point of view (such as an increase of the fee for use of the network due to the use of the network environment provided at a high charge rate should be avoided, a probability for the user to be able to obtain the necessary information at the necessary time should be increased even if it requires the use of the network environment provided at a high charge rate, etc.) in order to store the predicted information in the information storage unit of the terminal by the predicted time according to the relationship between the user's activity schedule and the network environment available at each time and the prediction concerning the information, and controlling the information transfer according to the determined information transfer plan.

Here, it is possible to pre-read the information set which is not necessarily within a range of a single locality for the information accesses, so that it is possible to reduce the possibility for being required to carry out the information transfer due to the transition from one locality to another locality in less preferable network environment in view of the evaluation criteria.

Moreover, it is possible to increase the possibility for carrying out more preferable information transfer control in view of the evaluation criteria, by detecting the network environment, determining which information transfer should be carried out in which network environment when by accounting for the actual detected network environment, and controlling the information transfer according to the determined information transfer plan.

Also, the accuracy of the prediction can be improved and the effects based on this prediction can be enhanced by obtaining the relationship between the user's activity and the attribute of the information, according to the relationship between the processing to be carried out and the date and time or place, the relationship between the processing to be carried out and the information to be used by the processing, and the relationship between the processings to be carried out according to the commands from the user.

Also, the accuracy of the prediction can be improved and the effects based on this prediction can be enhanced in conjunction with the use of the system by the user, by correcting the knowledge on the user's activity schedule and the knowledge on the relationship between the user's activity and the attribute of the information, according to the relationship between the processing to be carried out and the date and time or place, the relationship between the processing to be carried out and the information to be used by the processing, and the relationship between the processings to be carried out according to the commands from the user.

Also, the accuracy of the prediction can be improved and the effects based on this prediction can be enhanced quickly, without requiring the long time use by the user, by enabling the addition, correction, and/or selection of the knowledge on the user's activity schedule and the knowledge on the relationship between the user's activity and the attribute of the information according to the inputs from the user.

Also, it is possible to increase the possibility to carry out the information transfer control which is more preferable from the user's point of view, by enabling the addition, correction, and/or selection of the information transfer evaluation criteria according to the inputs from the user.

In addition, it is possible to effectively reduce the probability for the information (data or program) required by the user to be not stored in the information storage unit of the terminal by the time the user actually requires that information, as it becomes possible to carry out the information transfer at a time where the network suitable for the transfer is available, by detecting the current location of the terminal, predicting the future location of the terminal according to the user's activity schedule which is stored in advance, determining the transfer time and the network to be used for the predicted information according to the detected current location of the terminal, the predicted future location of the terminal, and the relationship between the terminal location and the available network which is stored in advance, and controlling the transfer of the information from the information server to the terminal according to the determined information transfer plan.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

For example, the functions of each one of the terminal 10, the information server 40, and the network service server 50 shown in FIG. 1, the second information server 60 shown in FIG. 13, the terminal 70, the information server 90, and the network service server 100 shown in FIG. 20, and the information server 200 shown in FIG. 22 can be implemented as a separate computer program for controlling the general purpose digital computer to realize the respective functions as described above. Such a computer program can be implemented as a software package to be installed on a general purpose digital computer in practice.

Such a software package can be a computer program product which employs a storage medium including stored computer code which is used to program a computer to perform the disclosed function and process of the present invention. The storage medium may include, but is not limited to, any type of conventional floppy disc, optical discs, CD-ROMs, magneto-optical discs, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information transfer control apparatus for realizing an information transfer to a first information processing apparatus from a second information processing apparatus via a network, comprising:
   a prediction unit for predicting information which will be required by a user using the first information processing apparatus in future and a location where the user will require the information, according to a knowledge concerning an activity schedule of the user; and
   a transfer control unit for determining at least one of a transfer time and a network to be used among at least one available network for the transfer of the information, and controlling the transfer of the information from the second information processing apparatus via the network according to said at least one of transfer time and network to be used such that the information will be transferred to the location.

2. The apparatus of claim 1, wherein the prediction unit and the transfer control unit are integrally incorporated within the first information processing apparatus.

3. The apparatus of claim 1, wherein the prediction unit and the transfer control unit are integrally incorporated within the second information processing apparatus.

4. The apparatus of claim 1, wherein the prediction unit and the transfer control unit are integrally incorporated within a network service server provided in conjunction with the network to which the first and second information processing apparatuses are connected.

5. The apparatus of claim 1, wherein the transfer control unit determines the network to be used for the transfer of the information, according to a knowledge concerning a relationship between the location and an available network, and controls the transfer of the information from the second information processing apparatus according to the determined network to be used.

6. The apparatus of claim 5, wherein the transfer control unit determines the network to be used also according to a current location of the first information processing apparatus.

7. The apparatus of claim 1, wherein the prediction unit also predicts a necessary time by which the information will be actually required by the user according to the knowledge concerning the activity schedule of the user, and the transfer control unit determines the transfer time for the transfer of the information according to the necessary time, and controls the transfer of the information according to the determined transfer time.

8. The apparatus of claim 7, wherein the transfer control unit determines said at least one of transfer time and network to be used for the transfer of the information according to a knowledge concerning an information transfer cost.

9. The apparatus of claim 7, wherein the transfer control unit determines said at least one of transfer time and network to be used for the transfer of the information according to a knowledge concerning a connection possibility of the network.

10. The apparatus of claim 7, wherein the transfer control unit determines said at least one of transfer time and network to be used for the transfer of the information according to an amount of the information.

11. The apparatus of claim 1, wherein the transfer control unit determines the transfer time and the network to be used for the transfer of the information according to a necessary time by which the information will be actually required by the user, the knowledge concerning the activity schedule of the user, and a knowledge concerning a relationship between the activity schedule of the user and a status/environment of an available network, and controls the transfer of the information according to the determined transfer time and network to be used.

12. The apparatus of claim 11, wherein the status/environment of the available network indicates time dependent information on the available network.

13. The apparatus of claim 1, further comprising:

an acquisition unit for acquiring at least one of a first relationship between a current processing carried out by the first information processing apparatus and at least one of present time and present place, and a second relationship between the current processing and a past processing carried out by the first information processing apparatus in past, and providing said at least one of the first and second relationships as the knowledge concerning the activity schedule of the user.

14. The apparatus of claim 1, wherein the prediction unit also uses a knowledge concerning a relationship between an activity of the user and an attribute of information in predicting the information.

15. The apparatus of claim 14, further comprising:

an acquisition unit for acquiring a relationship between a current processing carried out by the first information processing apparatus and an attribute of information handled by the current processing, and providing the acquired relationship as the knowledge concerning the relationship between an activity of the user and an attribute of information.

16. The apparatus of claim 1, wherein the knowledge concerning an activity schedule of the user is given in a form of a schedule table produced according to inputs by the user.

17. The apparatus of claim 1, wherein the transfer control unit controls the transfer of the information such that the information is transferred from the second information processing apparatus to a third information processing apparatus first, temporarily stored in the third information processing apparatus, and then transferred from the third information processing apparatus to the first information processing apparatus.

18. The apparatus of claim 17, wherein the transfer control unit is distributedly provided over the third information processing apparatus and one of the first information processing apparatus, the second information processing apparatus, and a network service server provided in conjunction with the network to which the first, second, and third information processing apparatuses are connected.

19. A method of information transfer to a first information processing apparatus from a second information processing apparatus via a network, comprising the steps of:

providing a knowledge concerning an activity schedule of a user using the first information processing apparatus;

predicting information which will be required by the user in future and a location where the user will require the information, according to the knowledge concerning an activity schedule of the user;

determining at least one of a transfer time and a network to be used among at least one available network for the transfer of the information; and controlling the transfer of the information from the second information processing apparatus via the network according to said at least one of transfer time and network to be used, such that the information will be transferred to the location.

20. An article of manufacture, comprising:

a computer usable medium having computer readable program code means embodied therein for causing a computer to function as a system for controlling an information transfer to a first information processing apparatus from a second information processing apparatus via a network, the computer readable program code means including:

first computer readable program code means for causing the computer to provide a knowledge concerning an activity schedule of a user using the first information processing apparatus;

second computer readable program code means for causing the computer to predict information which will be required by the user in future and a location where the user will require the information, according to the knowledge concerning an activity schedule of the user; and third computer readable program code means for causing the computer to determine at least one of a transfer time and a network to be used among at least one available network for the transfer of the information, and control the transfer of the information from the second information processing apparatus via the network according to said at least one of transfer time and network to be used, such that the information will be transferred to the location.

* * * * *